United States Patent
Maenishi et al.

(10) Patent No.: US 7,664,554 B2
(45) Date of Patent: Feb. 16, 2010

(54) LINE BALANCE CONTROL METHOD, LINE BALANCE CONTROL APPARATUS, AND COMPONENT MOUNTING MACHINE

(75) Inventors: Yasuhiro Maenishi, Yamanashi (JP); Ikuo Yoshida, Kyoto (JP)

(73) Assignee: Panasonic Corporation, Osaka (JP)

( * ) Notice: Subject to any disclaimer, the term of this patent is extended or adjusted under 35 U.S.C. 154(b) by 467 days.

(21) Appl. No.: 10/597,285

(22) PCT Filed: May 19, 2005

(86) PCT No.: PCT/JP2005/009588

§ 371 (c)(1),
(2), (4) Date: Jul. 19, 2006

(87) PCT Pub. No.: WO2005/116786

PCT Pub. Date: Dec. 8, 2005

(65) Prior Publication Data

US 2008/0228304 A1 Sep. 18, 2008

(30) Foreign Application Priority Data

May 21, 2004 (JP) .............................. 2004-152504

(51) Int. Cl.
*G05B 19/18* (2006.01)
(52) U.S. Cl. ....................................................... 700/9
(58) Field of Classification Search .................... 700/9, 700/108, 249; 712/28
See application file for complete search history.

(56) References Cited

U.S. PATENT DOCUMENTS

| | | | |
|---|---|---|---|
| 4,580,207 A | 4/1986 | Arai et al. | |
| 5,177,688 A | 1/1993 | Rentschler et al. | |
| 5,584,118 A | 12/1996 | Furukawa et al. | |
| 5,625,832 A * | 4/1997 | Ohsawa et al. | 712/28 |
| 6,104,965 A | 8/2000 | Lim et al. | |
| 6,378,200 B1 | 4/2002 | Lim et al. | |
| 6,729,018 B1 * | 5/2004 | Takano et al. | 29/743 |
| 6,971,161 B1 * | 12/2005 | Maenishi et al. | 29/832 |
| 2002/0143423 A1 | 10/2002 | Huber et al. | |

FOREIGN PATENT DOCUMENTS

| | | |
|---|---|---|
| EP | 0 400 624 A2 | 12/1990 |
| EP | 0 987 613 A2 | 3/2000 |
| JP | 04-196296 | 7/1992 |
| JP | 2003-174299 | 6/2003 |

* cited by examiner

*Primary Examiner*—Albert DeCady
*Assistant Examiner*—Sivalingam Sivanesan
(74) *Attorney, Agent, or Firm*—Pearne & Gordon LLP

(57) ABSTRACT

To provide a line balance control method, a line balance control apparatus, and a component mounting machine, which do not require a higher-level device. A production line 100 is equipped with a printing machine 120, a coating machine 130, a component mounting machine 101, a component mounting machine 102, and a reflow machine 140, and they are connected through a communication line 110, respectively. In addition, a line balance control device, which is equipped with possibility inquiring means which makes an inquiry of whether or not it is possible to mount components to be allocated, among the components to be mounted, to the component mounting machines 101, 102, possibility obtaining means which obtains a response to the inquiry in the possibility inquiring means, and allocating means which allocates components to be mounted, to each component mounting machine 101, 102, in such a manner that mounting time at each component mounting machine is equalized, on the basis of the response obtained in the possibility obtaining means, is disposed in a device which configure the production line 100.

25 Claims, 27 Drawing Sheets

FIG. 4

| NAME OF API | MEANING |
|---|---|
| TransInfo() | COMPONENT ALLOCATING DEVICE CONVEYS VARIOUS INFORMATION SUCH AS MOUNTING POSITION INFORMATION, MOUNTING CONDITION, RESTRICTION CONDITION, TO COMPONENT MOUNTING MACHINE |
| MakeSetupValid() | COMPONENT ALLOCATING DEVICE MAKES INQUIRY OF WHETHER OR NOT MOUNTING OF SPECIFIED COMPONENTS IS POSSIBLE, TO COMPONENT MOUNTING MACHINE |
| OptimizeSetup() | COMPONENT ALLOCATING DEVICE MAKES INQUIRY OF MOUNTING TACT ETC. IN CASE THAT SPECIFIED COMPONENTS WERE MOUNTED, TO COMPONENT MOUNTING MACHINE |

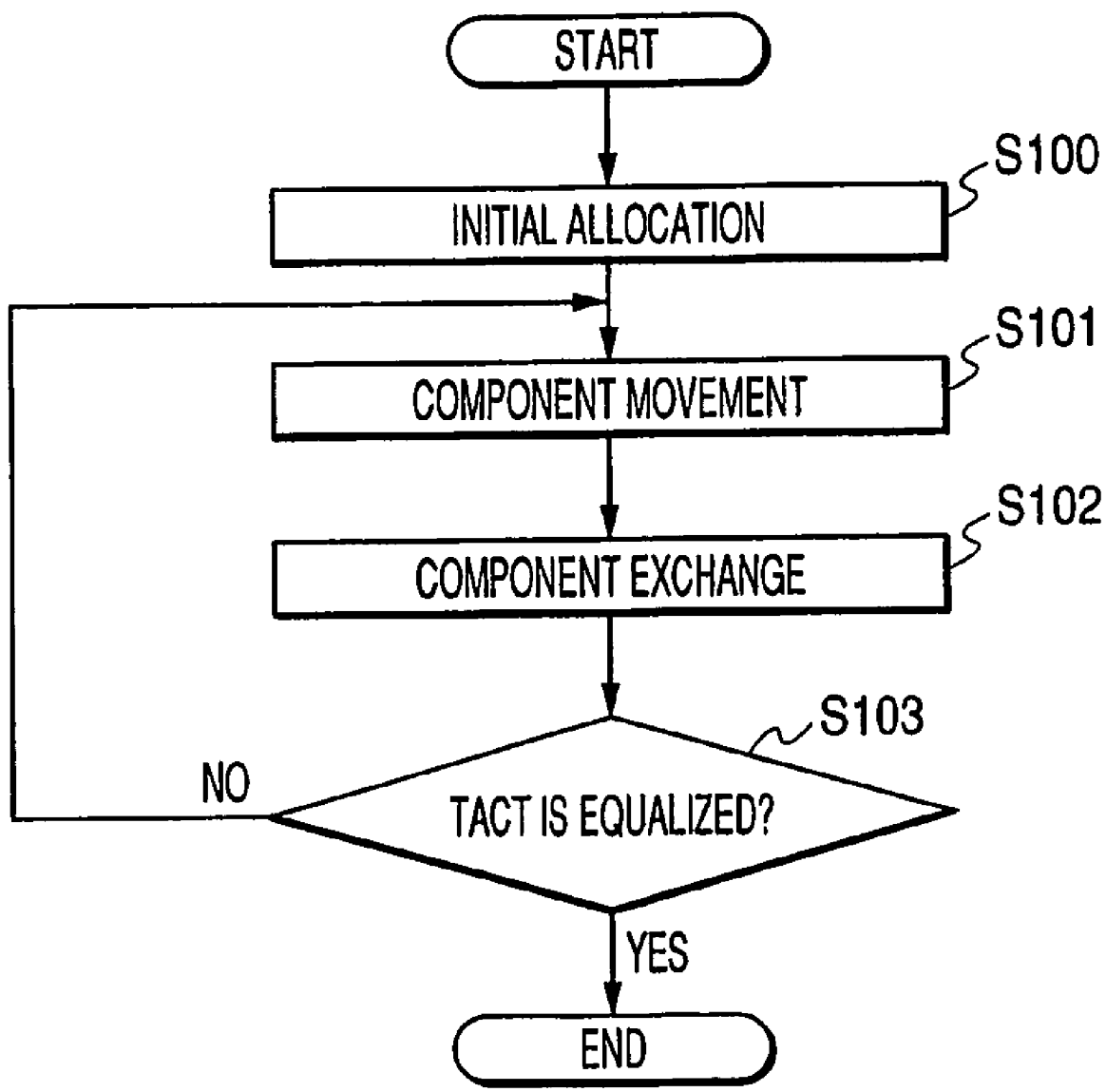

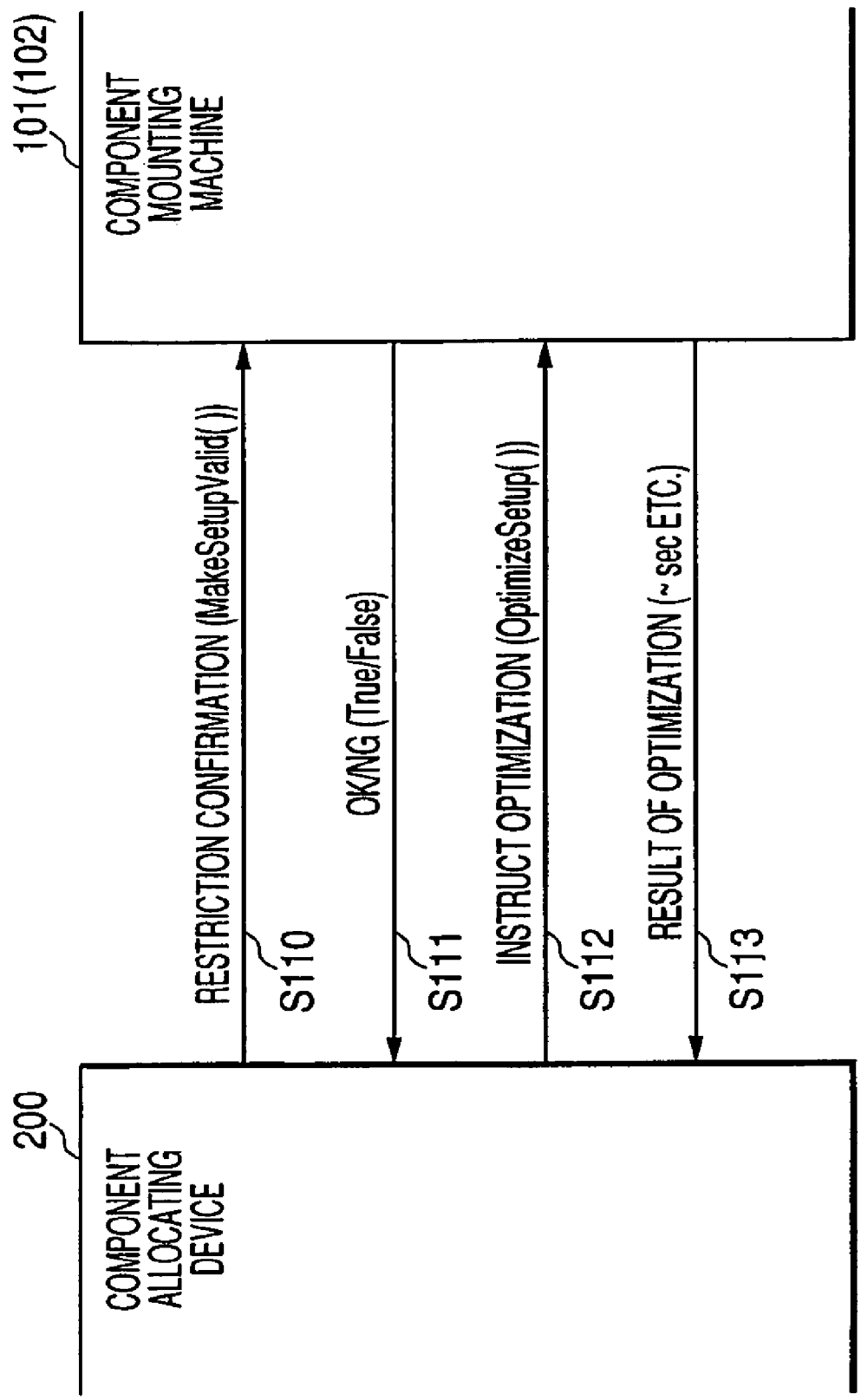

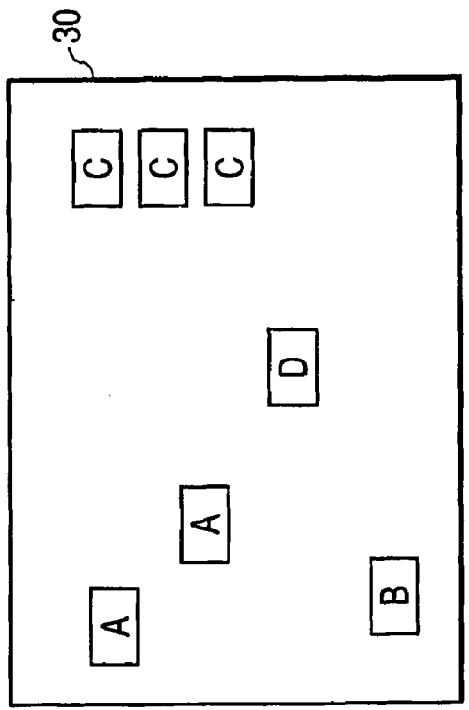
FIG. 10(b)
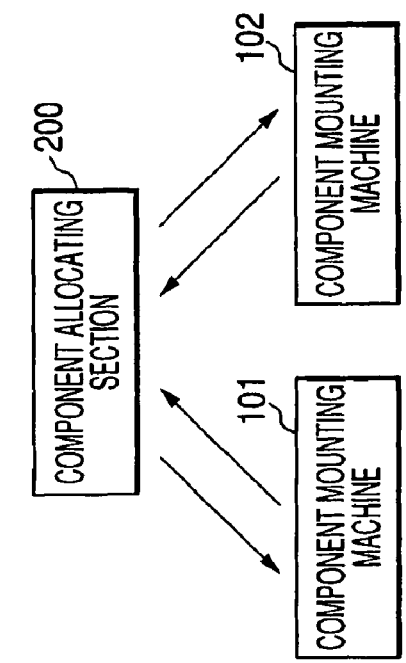
FIG. 10(c)
FIG. 10(b)
| | COMPONENT A | COMPONENT B | COMPONENT C | COMPONENT D |
|---|---|---|---|---|
| COMPONENT MOUNTING MACHINE 101 | | | | |
| COMPONENT MOUNTING MACHINE 102 | | | | |

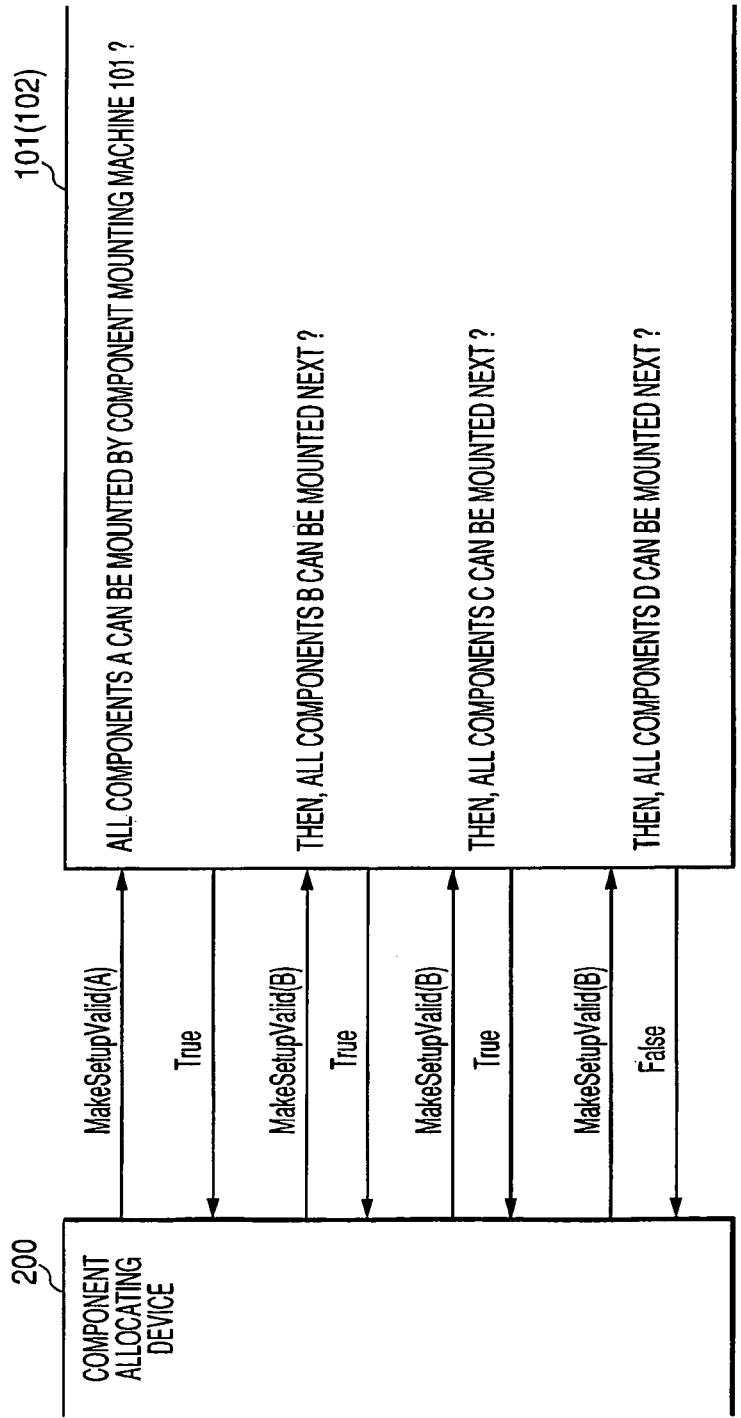

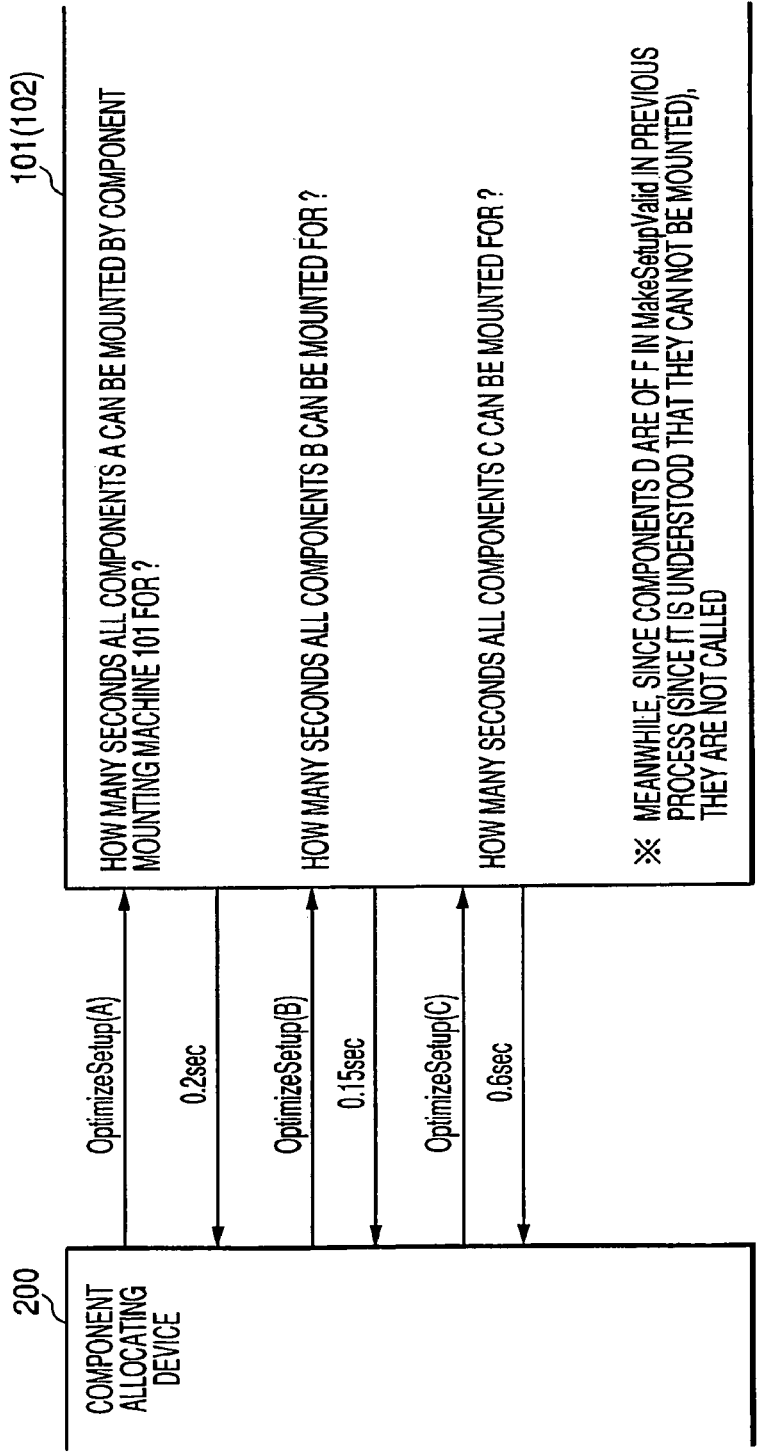

| | COMPONENT A | COMPONENT B | COMPONENT C | COMPONENT D |
|---|---|---|---|---|
| COMPONENT MOUNTING MACHINE 101 | 0.2 | 0.15 | 0.6 | F |
| COMPONENT MOUNTING MACHINE 102 | F | 0.15 | 0.75 | 0.3 |

241

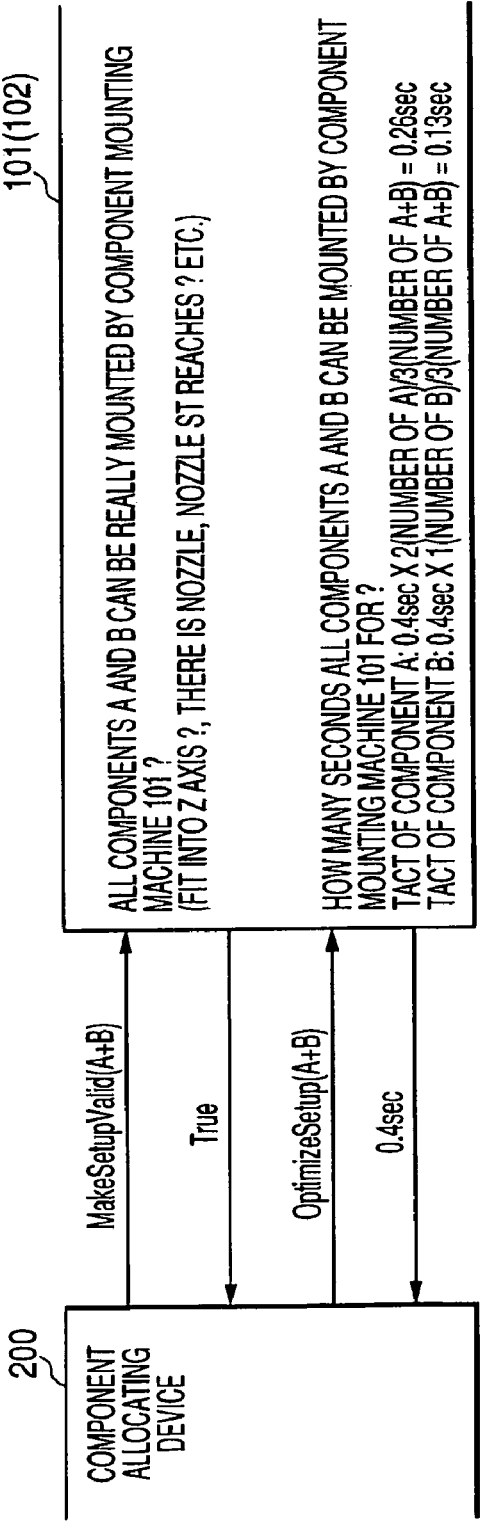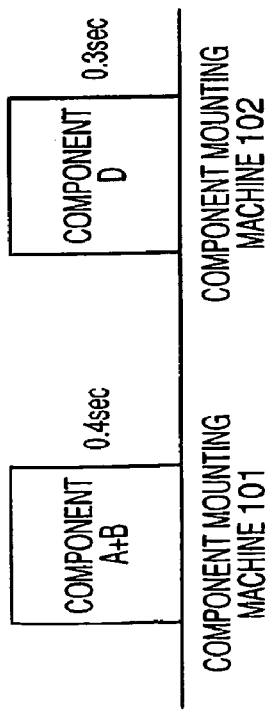

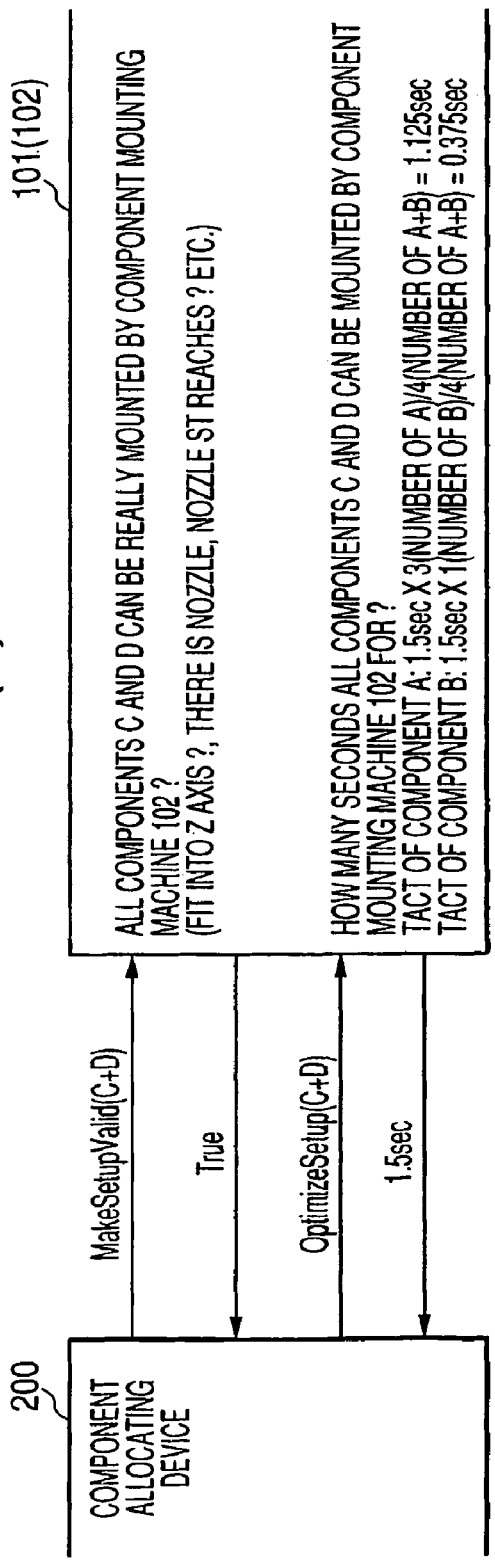
FIG. 15(a)
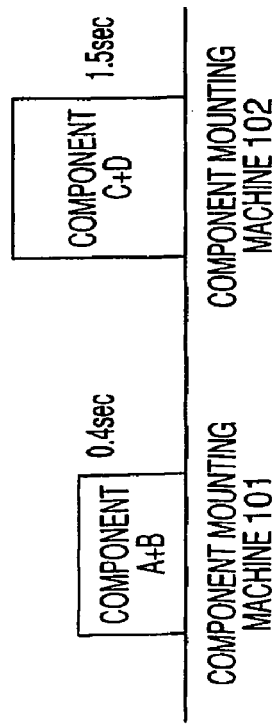
FIG. 15(c)
FIG. 15(b)

COMPONENT MOUNTING MACHINE A
ACTUAL PRODUCTION TIME: 35 SECONDS

COMPONENT MOUNTING MACHINE B
ACTUAL PRODUCTION TIME: 50 SECONDS

COMPONENT MOUNTING MACHINE A    COMPONENT MOUNTING MACHINE B

LINE BALANCE CONTROL METHOD, LINE BALANCE CONTROL APPARATUS, AND COMPONENT MOUNTING MACHINE

TECHNICAL FIELD

This invention relates to a line balance control method and a line balance control apparatus, intended for a production line including a plurality of component mounting machine, and a component mounting machine which is included in this production line.

BACKGROUND TECHNOLOGY

In the past, in a component mounting line for mounting components such as electronic components onto a substrate such as a printed wiring board, it is important to carry out equalization (leveling) of tact in each component mounting machine that configure the component mounting line, in order to realize shorter tact (mounting time).

On the occasion of carrying out the suchlike equalization of tact, there is such a technology that a higher-level device, which is located in a higher-level of each component mounting machine of the component mounting line, is disposed separately, and this higher-level device becomes an optimization device of a component mounting process, and mounting object components are allocated to component mounting machines (e.g., JP-A-2003-174299 publication).

However, the above-described higher-level device is one which requires high processing ability, and there was a problem from the side of cost.

SUMMARY OF THE INVENTION

The invention is one which was made in view of the above-described past circumstances, and aims to provide a line balance control method, a line balance control apparatus, and a component mounting machine, which do not require a higher-level device.

In addition, the invention aims to provide a line balance control method, a line balance control apparatus, and a component mounting machine, reflecting an actual production state.

A line balance control method of the invention is a line balance control method which targets at production line having a plurality of component mounting machines that mount components on a substrate and which controls line balance by, allocating components to be mounted, to each component mounting machine, and includes a possibility inquiring step in which at least one of devices including the component mounting machines that configure the production line makes an inquiry of whether or not it is possible to mount components to be allocated, to component mounting machines which become allocation destinations, a possibility obtaining step in which the device obtains a response to the inquiry in the possibility inquiring step, and an allocating step in which the device or another device that configures the production line allocates components to be mounted, to each component mounting machine, in such a manner that mounting time at each component mounting machine is equalized, on the basis of the response obtained in the possibility obtaining step.

By this method, it is possible to carry out line balance control without using a higher-level device.

In addition, in the line balance control method of the invention, the above-described possibility inquiring step is carried out by a device which does not require optimization of that device itself, among devices which are included in the production line.

In addition, in the line balance control method of the invention, the above-described device, which does not require the simple body optimization, is any one of a printing machine and a reflow machine. By this method, it is possible to have a device which relatively has a room in CPU processing ability like a printing machine or are flow machine, executed line balance control.

In addition, in the line balance control method of the invention, it further has a step of obtaining a load which is loaded to an arithmetic processing section that each device, which is included in the production line, has, through a communication line connected between the devices, and the possibility inquiring step is carried out by a device which has the largest room in processing ability of the arithmetic processing section. By this method, it is possible to take hold of processing ability of the arithmetic processing section, and therefore, it is possible to have a device having the largest room executed line balance control.

In addition, the line balance control method of the invention further has a step of obtaining a connecting position in the production line, and, in case that mounting of components by use of the plurality of component mounting machines is carried out in the order corresponding to component height, the possibility inquiring step is carried out by a component mounting machine which has been connected to uppermost stream.

In addition, the line balance control method of the invention further has a step of obtaining a connecting position in the production line, and, in case that mounting of components by use of the plurality of component mounting machines is carried out in the order corresponding to component height, the possibility inquiring step is carried out by a component mounting machine which has been connected to lowermost stream.

In addition, the line balance control method of the invention further has a step of obtaining production time of each device which is included in the production line, through a communication line which was connected between the devices, and the possibility inquiring step is carried out by a component mounting machine in which the production line is the longest.

In addition, the line balance control method of the invention further has a step of obtaining production time of each device which is included in the production line, through a communication line which was connected between the devices, and the possibility inquiring step is carried out by a component mounting machine in which the production line is the shortest.

In addition, the invention provides an apparatus which carries out control of line balance intended for a production line including a plurality of component mounting machines and configures the production line, and the apparatus is equipped with a possibility inquiring section which makes an inquiry of whether or not it is possible to mount components to be allocated, among the components to be mounted, to component mounting machines which become allocation destinations, a possibility obtaining section which obtains a response to the inquiry in the possibility inquiring section, and an allocating section which allocates components to be mounted, to each component mounting machine, in such a manner that mounting time at each component mounting machine is equalized, on the basis of the response obtained in the possibility obtaining section.

By this configuration, it is possible to carry out line balance control without using a higher-level device.

In addition, the above-described apparatus is further equipped with another device information obtaining section which obtains at least one information of information of a load which is loaded to an arithmetic processing section, connecting position information, production time information, in another device which is included in the production line, through a communication line, and an allocation control section which decides whether the possibility inquiring section, the possibility obtaining section, and the allocating section are operated or not, on the basis of information of the obtained another device information and corresponding own device information.

By this configuration, information of each device in a production line is obtained, and on the basis of that information, it is possible to have a desired device executed line balance control.

In addition, a program of the invention is a program which targets at production line having a plurality of component mounting machines that mount components on a substrate, for controlling line balance by allocating components to be mounted, to each component mounting machine, and the program has an arithmetic processing section of at least one of devices' including the component mounting machines that configure the production line, executed a process of making an inquiry of whether or not it is possible to mount components to be allocated, to component mounting machines which become allocation destinations, and a process of obtaining a response to the inquiring process, and it has the device or another device that configures the production line, executed a process of allocating components to be mounted, to each component mounting machine, in such a manner that mounting time at each component mounting machine is equalized, on the basis of the response obtained in the obtaining process.

By this program, information of each device in a production line is obtained, and on the basis of that information, it is possible to have a desired device executed line balance control.

In addition, the invention provides a computer readable recording medium on which the above-described program.

A line balance control method of the invention is a line balance control method which targets at a production line having a plurality of component mounting machines that mount components on a substrate, and has an actual production information obtaining step of obtaining actual production information regarding a state after actual production start from each component mounting machine, a judging step of judging whether or not control of line balance is necessary or not on the basis of the actual production information of each component mounting machine, and a line balance adjusting step of carrying out at least one processing among component allocation to each component mounting machine and a change of a mounting pattern on a substrate which each component mounting machine is in charge of, in case that it was judged that the control of line balance is necessary.

By this method, it is possible to carry out line balance control reflecting actual production, and therefore, it is possible to improve production efficiency.

In addition, in the line balance control method of the invention, the above-described actual production information obtaining step includes a step of obtaining actual production time of each component mounting machine, as the actual production information. By this method, it is possible to carry out line balance control reflecting actual production time.

In addition, in the line balance control method of the invention, the above-described judging step judges that line balance control is necessary in case that there occurred a difference of a predetermined amount or more, between the actual production time and production time which was virtually obtained. By this method, it is possible to carry out control of line balance in case that the reoccurred a difference of a predetermined amount or more, between the actual production time and production time which was virtually obtained.

In addition, in the line balance control method of the invention, the above-described judging step judges that line balance control is necessary in case that a difference of actual production time between respective component mounting machines is of a predetermined amount or more. By this method, it is possible to carry out line balance control in case that a difference of actual production time between respective component mounting machines is of a predetermined amount or more.

In addition, in the line balance control method of the invention, the above-described line balance adjusting step further has, in case of carrying out component allocation of each component mounting machine, a possibility inquiring step of making an inquiry of whether or not it is possible to mount components to be allocated, a possibility obtaining step of obtaining a response to the inquiry in the possibility inquiring step, and a step of allocating components to be mounted, to each component mounting machine, in such a manner that mounting time at each component mounting machine is equalized, by use of the obtained actual production time, on the basis of the response obtained in the possibility obtaining step.

By this method, it is possible to carry out component allocation processing in accordance with actual production time.

In addition, in the line balance control method of the invention, the above-described line balance adjusting step carries out allocation of the number of mounting patterns in accordance with a ratio of actual production time between the component mounting machines, in case of changing the mounting pattern which each component mounting machine is in charge of. By this method, it is possible to carry out adjustment of line balance, by carrying out allocation of the number of mounting patterns of component mounting machines.

In addition, in the line balance control method of the invention, the above-described actual production information obtaining step includes a step of obtaining a component supply state in each component mounting machine, as the actual production information. by this method, it is possible to carry out line balance adjustment in accordance with a component supply state.

In addition, in the line balance control method of the invention, the above-described judging step judges that control of line balance is necessary in case that component shortage was detected, as the component supply state. By this method, it is possible to carry out control of line balance in case that there occurred component shortage.

In addition, in the line balance control method of the invention, the above-described line balance adjusting step allocates components of the component shortage, to a component mounting machine which is different from a component mounting machine in which the component shortage was detected. By this method, even in case that there occurred component shortage, it is possible to respond promptly.

In addition, in the line balance control method of the invention, the above-described actual production information obtaining step includes a step of obtaining production stoppage information in each component mounting machine, as the actual production information, and the above-described judging step judges that control of line balance is necessary, in case that there exists a component mounting machine which stopped production, and the above-described line balance adjusting step allocates components which the component mounting machine, which stops production, is mounting, to a component mounting machine other than the component mounting machine which stopped production.

By this method, it is possible to respond promptly at the time of maintenance of component mounting machines and at the time of malfunction.

In addition, in the line balance control method of the invention, the above-described actual production information obtaining step includes a step of obtaining information which shows frequency of errors due to at least one of absorption errors and mounting errors of components to be mounted in each component mounting machine, as the actual production information, and the above-described judging step judges that line balance adjustment is necessary in case that there exist components with the error frequency of a predetermined amount or more, and the above-described line balance adjusting step includes a step of allocating components with errors of the predetermined frequency or more, to another component mounting machine.

By this method, components with many absorption errors and mounting errors are allocated to other devices, and therefore, it is possible to heighten production quality as well as improvement of production efficiency.

In addition, in the line balance control method of the invention, it is possible to further dispose a step in which a device, which allocated components to be mounted to each component mounting machine, specifies another device, and a step of giving allocation data describing which component mounting machine components to be mounted, which are used in the allocating step, are allocated to, to the specified another device.

In addition, in the line balance control method of the invention, it is possible to further dispose a step of giving allocation data describing which component mounting machine components to be mounted, which are used in the allocating step, are allocated to, to at least one another device other than the device which allocated components to be mounted, to each component mounting machine.

According to the invention, it is possible to provide a line balance control method, a line balance control apparatus, and a component mounting machine, which do not require a higher-level device.

In addition, it is possible to provide a line balance control method, a line balance control apparatus, and a component mounting machine, reflecting an actual production state.

BRIEF DESCRIPTION OF THE DRAWINGS

FIG. 4 is a view which shows an example of API.

FIG. 5 is a flow chart showing schematic processes of allocating components to be mounted on a substrate.

FIG. 9 is a flow chart which shows a process of correspondences (inquiry and response) between a component allocating device and a component mounting machine.

FIG. 10 is a view for explaining a concrete example of component allocation including correspondences between the component allocating device and the component mounting machine.

FIG. 11 is a view which shows a concrete example of initial allocation.

FIG. 12 is a view which shows a concrete example of initial allocation.

FIG. 14 is a view which shows a concrete example of initial allocation.

FIG. 15 is a view which shows a concrete example of initial allocation.

BEST MODE FOR CARRYING OUT THE INVENTION

First Embodiment

This embodiment does not dispose a higher-level device for allocating components which becomes mounting objects, in component mounting machines which were disposed in a substrate production line. Alternatively, it is designed in such a manner that the component mounting machine itself and another device which configures the production line carry out the suchlike allocation of components, to carry out equalization (leveling) of tact in each component mounting machine, and to shorten total substrate production time (hereinafter, the suchlike control is referred to as "line balance (control)"). Under the suchlike configuration, there is need to prevent processing load from being concentrated on a device which carries out line balance control. On this account, this embodiment is configured in such a manner that the device, which carries out line balance control, makes an inquiry to component mounting machines, and carries out allocation of components interactively. By the suchlike control, it is possible to prevent processing load from being concentrated on the device which carries out line balance control, and component allocation is realized on the initiative of devices on a production line.

Figure 1:
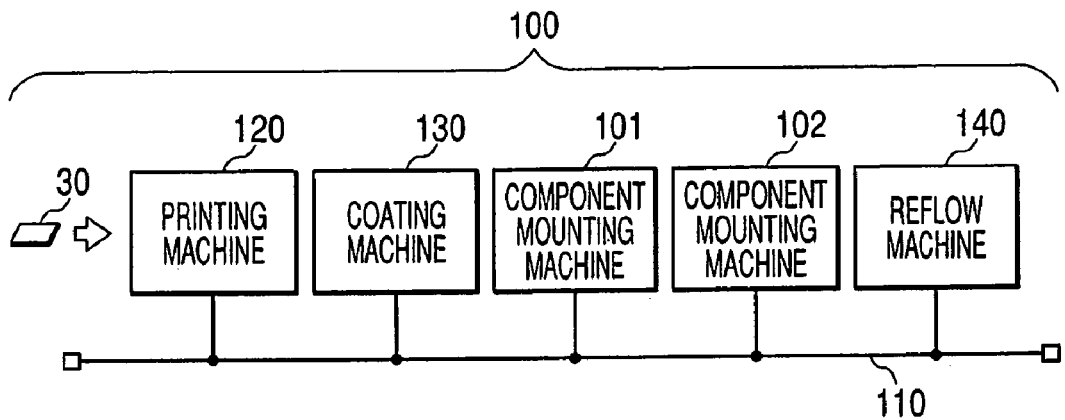
FIG. 1 is a schematic block diagram which shows a substrate production line which relates to the first embodiment of the invention.

FIG. 1 is a schematic block diagram which shows a substrate production line 100 (hereinafter, production line) which relates to the first embodiment of the invention. As shown in FIG. 1, the production line 100 is equipped with a printing machine 120 which prints cream solder onto a substrate 30, a coating machine 130 which coats an adhesive agent for bonding electronic components to a substrate on which the cream solder was printed, a plurality of component mounting machines 101, 102 which mount electronic components onto a substrate, and a reflow machine 140 which melts the cream solder to a substrate on which components were mounted by the component mounting machines 101, 102 to carry out soldering.

These printing machine 120, coating machine 130, component mounting machines 101, 102, and reflow machine 140 are connected through a wireless communication line 110. In this embodiment, as an example of the communication line, a case in which LAN (Local Area Network) is used will be described.

Figure 2:
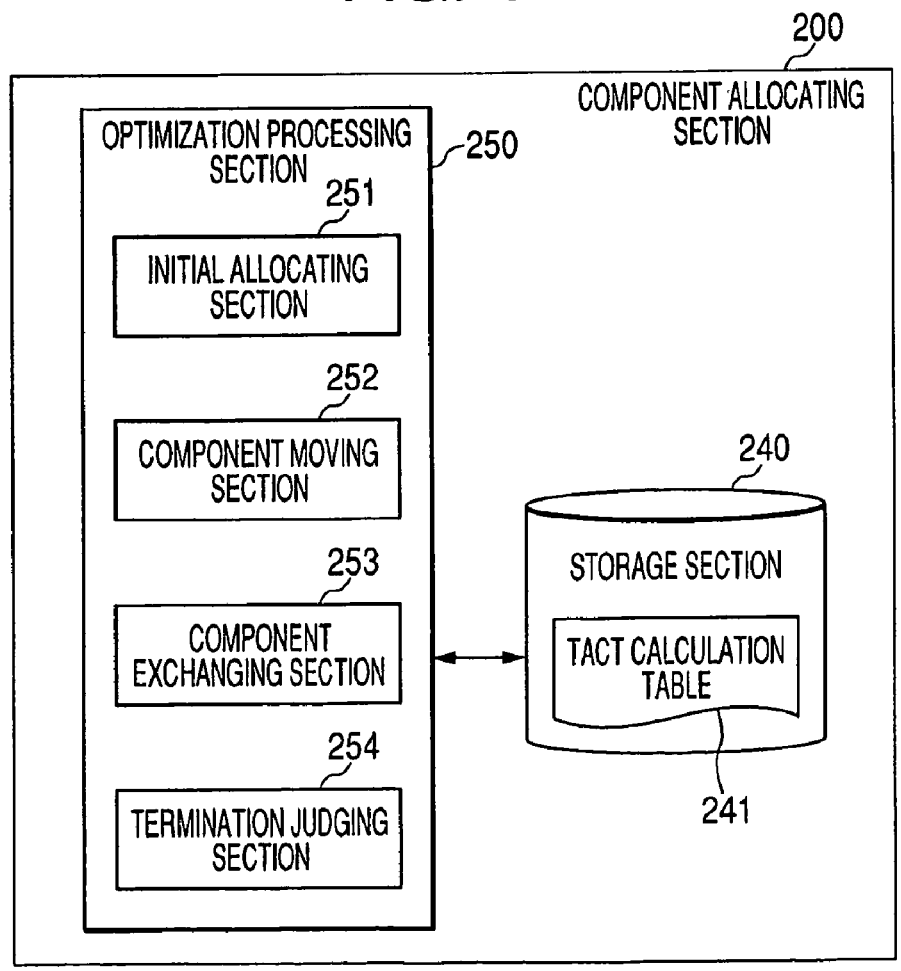
FIG. 2 is a functional block diagram which shows a schematic configuration of a component allocating section having a line balance control function.

FIG. 2 is a functional block diagram which shows a schematic configuration of a component allocating section having a line balance control function. This component allocating section 200 is disposed in at least anyone device of the printing machine 120, the coating machine 130, the component mounting machines 101, 102, and the reflow machine 140 shown in FIG. 1. That is, it is disposed in a device which configures the production line 100.

The component allocating section 200 is a computer device etc. which allocates mounting components by a component unit (here, a type of a component), in such a manner that respective mounting time of the component mounting machines 101, 102 which are included in the production line 100 is equalized, and is equipped with a storage section 240 and an optimization processing section 250.

The storage section 240 is a memory, a hard disc etc. for storing information which is necessary for component allocation and data etc. which is temporarily generated, and holds a tact calculation table 241 which is a temporary storage data table showing tact and mounting possibility with respect to each component type by respective component mounting machine 101 through 102.

The optimization processing section 250 is composed of a program executing component allocation and CPU etc., and is equipped with an initial allocating section 251, a component moving section 252, a component exchanging section 253 and a termination judging section 254.

The initial allocating section 251 allocates object components to component mounting machines in such a manner that line tact is equalized, sequentially. At this time, it allocates after it confirmed that component mounting machines can mount components as objects.

The component moving section 252 changes allocation by moving components which have been already allocated, between two units of component mounting machines, and carries out control of line balance, to equalize line tact. For example, by changing allocation of components which were allocated to a component mounting machine with the largest tact to a component mounting machine with the smallest tact, line tact is reduced.

The component exchanging section 253 exchanges components which have been already allocated, between two units of component mounting machines, to realize equalization of line tact. For example, by exchanging allocated components between a component mounting machine with the largest tact and a component mounting machine with the smallest tact, allocation of components is changed, to reduce line tact.

The termination judging section 254 judges whether or not equalization of line tact was sufficiently realized. In sums it judges whether or not component allocation was carried out so as to satisfy a predetermined certain condition, and in case that it is satisfied, a series of component allocation processing is terminated.

Figure 3:
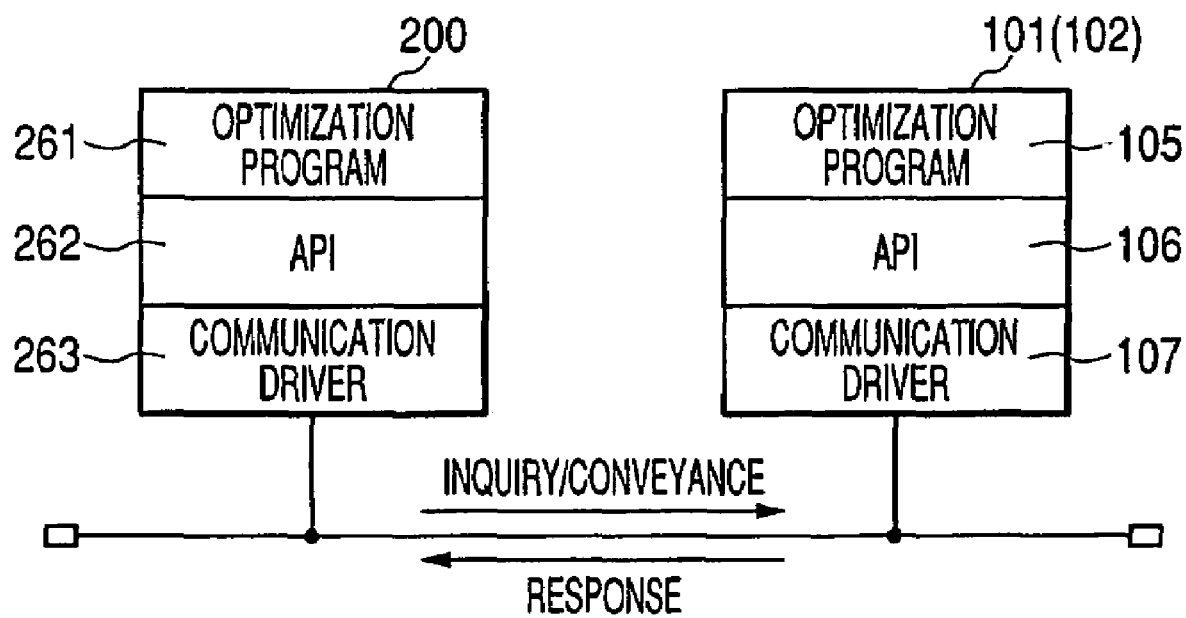
FIG. 3 is a view which shows a software configuration of the component allocating section and component mounting machines.

FIG. 3 is a view which shows a software configuration of the component allocating section 200 and the component mounting machines 101 through 102. Any one of the component allocating section 200 and the component mounting machines 101 through 102 has a hierarchized configuration as software regarding component allocation, and is equipped, from a lower layer, with communication drivers 264 and 107 for communicating through a communication line 110, API (Application Program Interface) 262 and 106 which are a common interface program for component allocation, and optimization programs 261 and 105 for component allocation.

The optimization program 261, which the component allocating section 200 is equipped with, is a program which realizes a function of the optimization processing section 250, and it describes processing for carrying out component allocation over communicating with the component mounting machines 101 through 102 through API 262. On one hand, the optimization program 105, which the component mounting machines 101 through 102 are equipped with, describes processing for obtaining information which has been sent from the component allocating section 200 through API 106, and for generating and sending back a response to an inquiry from the component allocating section 200 through API 106, and so on.

FIG. 4 is a view which shows an example of API 262 and 106. For example, API "TransInfo( )" is a sub program (function which is called out from a main routine of the optimization program 261) which conveys information etc. as to object components for component allocation, various data which becomes the premise of component allocation, from the component allocating section 200 to the component mounting machines 101 through 102. The various data to be conveyed includes mounting position information (a list of mounting positions on a substrate and component names), mounting conditions with respect to each component (a type of a camera which is used for confirming an absorbing state of components to amounting head, and an absorbing nozzle, XY restriction speed at the time that it moves in such a state that components were absorbed by the mounting head, a width of a component cassette which contains components, etc.), restriction information by a user (Z fixing information showing which position of which component mounting machine components are fixed at, nozzle fixing information showing which nozzle is fixed to which nozzle station number, etc.) and so on.

In addition, API "MakeSetuValid( )" is such a sub program that the component allocating section 200 makes an inquiry of whether or not it is mountable as to a component which was specified by argument, to the component mounting machines 101 through 102, and to this inquiry, the component mounting machines 101 through 102 make responses of True or False to the component allocating section 200.

Furthermore, API "OptimizeSetu( )" is such a sub program that the component allocating section 200 makes an inquiry of mounting tact, mounting order, Z axis array etc. in case that the component specified by argument was mounted, to the component mounting machines 101 through 102, and to this inquiry, the component mounting machines 101 through 102 applied optimization as to mounting order of components, and thereafter, make responses of mounting tact, mounting order, Z axis array etc., which are obtained as its result, to the component allocating section 200.

In this manner, the component allocating section 200 carries out optimum component allocation over repeating various inquiries to the component mounting machines 101 through 102 through API 262, and thereby, it is possible to carry out unbroken component allocation in consideration of restrictions etc. of individual component mounting machines 101 through 102, by common processing which does not rely on models of the component mounting machines 101 through 102.

Next, an operation of the component allocating section 200 which was configured as above will be described. FIG. 5 is a flow chart showing such schematic processes that the component allocating section 200 allocates components to be mounted on a substrate, to respective component mounting machine 101 through 102.

Firstly, the component allocating section 200 carries out initial allocation (S100). In sum, the initial allocating section 251 of the component allocating section 200 exchanges information with the component mounting machines 101 through 102 and allocates all components which become objects, to any component mounting machines which can mount them, with respect to each type of components, over equalizing tact, sequentially. In sum, processing for allocating components to a component mounting machine which can mount object components and is of the smallest tact is repeated sequentially until all components run out.

Figure 6:
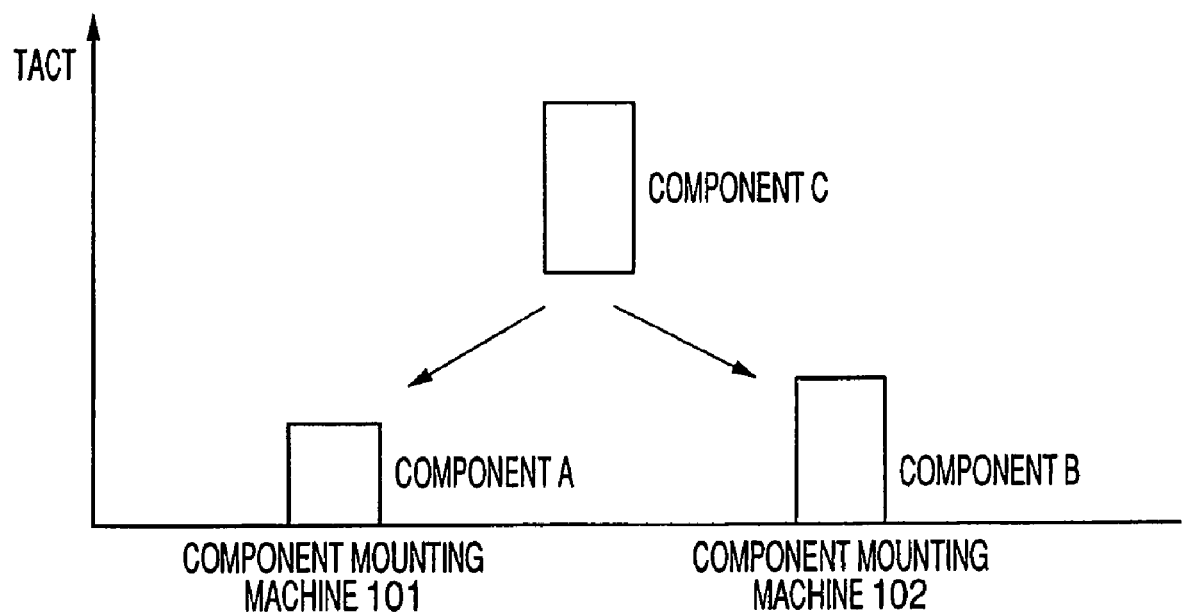
FIG. 6 is a view which shows an example of initial allocation.

FIG. 6 is a view which shows an example of the suchlike initial allocation. It shows such an appearance that now, a component A is allocated to the component mounting machine 101, and a component B is allocated to the component allocating machine 102, and a component C will be allocated from now. Meanwhile, the component allocating section 200 is to confirm that the component C can be mounted to any one of the component mounting machines 101 and 102 by a preliminary inquiry. In the suchlike case, the initial allocating section 251 calculates mounting tact of the components A and B which were allocated to the current component mounting machines 101 through 102, and allocates the component C, which will be next allocated, to the component mounting machine 101 with smaller tact. Meanwhile, in case that components are not allocated at all and in case that all component mounting machines are of the same tact, it may be allocated to any component mounting machine.

Next, the component allocating section 200 carries out movement of components (S101 of FIG. 5). For example, the component moving section 252 of the component allocating section 200 moves components which have been already allocated, from a component mounting machine with the largest tact to another component mounting machine (e.g., component mounting machine with the smallest tact), and thereby, realizes equalization of tact. At this time, as a component to be moved, for example, such a component that tact after movement is most equalized is selected.

Figure 7:
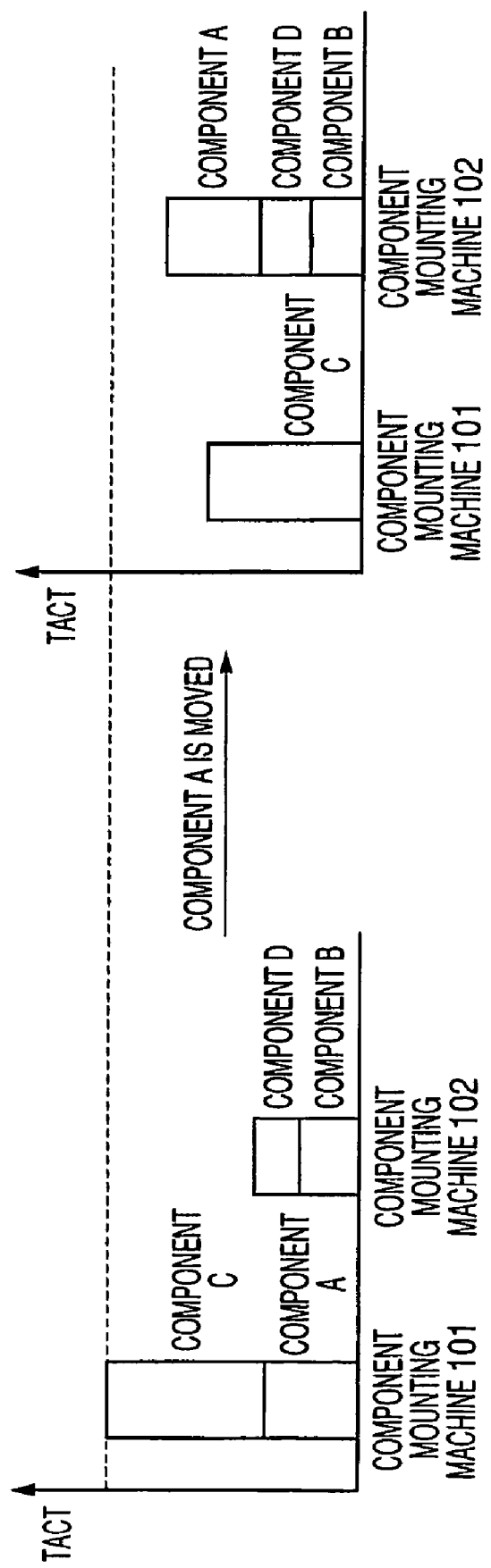
FIG. 7 is a view which shows an example of component movement.

FIG. 7 is a view which shows an example of the suchlike component movement. Now, it is assumed that the components A and C are allocated to the component mounting machine 101 and the components B and D are allocated to the component mounting machine 102. In the suchlike case, the component moving section 252, moves the component A by which equalization of tact is realized, to the component mounting machine 102 with smaller tact, among the components A and C which were allocated to the component mounting machine 101 with larger tact. Meanwhile, in cased that line tact is not lowered even if a component is moved, i.e., in case that a maximum value in tact with respect to each component mounting machine does not become smaller than that before the movement, it goes to a next step without moving a component.

Subsequently, the component allocating section 200 carries out exchange of components (S102 of FIG. 4). In sum, the component exchanging section 253 of the component allocating section 200 selects two units of component mounting machines arbitrarily, and exchanges components which were allocated to them, and in case that equalization of tact was realized, adopts that component exchange. For example, it selects a component mounting machine with the largest tact and a component mounting machine with the smallest tact in the production line 100, and calculates whether or not maximum tact becomes smaller by component exchange, as to all combination of exchangeable two components, among components which were allocated between these two units of component mounting machines, and in case that it becomes smaller, adopts component exchange by which tact is most equalized.

Figure 8:
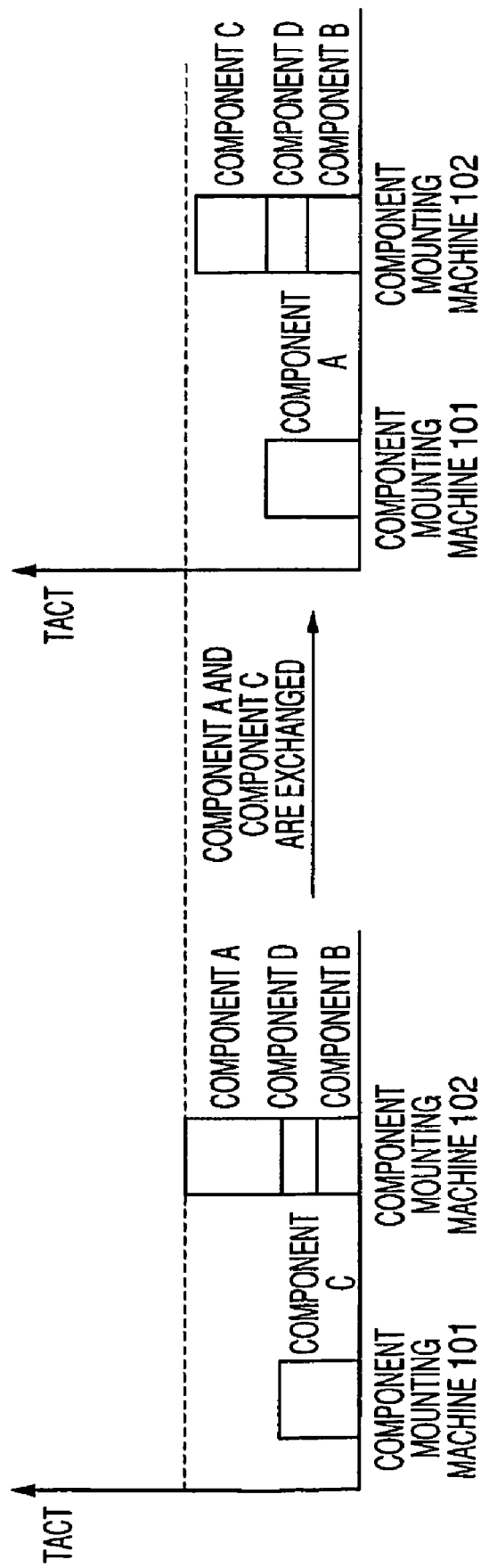
FIG. 8 is a view which shows an example of component exchange.

FIG. 8 is a view which shows an example of the suchlike component exchange. It is assumed that now, the component C is allocated to the component mounting machine 101 with the smallest tact, and the components A, B and D are allocated to the component mounting machine 102 with the largest tact. In the suchlike case, the component exchanging section 253 calculates whether or not tact becomes smaller, by carrying out component exchange, as to exchangeable all combinations of components (here, the components C and A, the components C and B, the components C and D), and in case that there is such a combination that it becomes smaller, adopts such a combination that tact becomes the smallest, among them. Here, tact becomes smaller by exchanging the component C which was allocated to the component mounting machine 101 and the component C which was allocated to the component mounting machine 102, and therefore, this component exchange will be carried out.

Finally, the component allocating section 200 judges whether or not equalization of tact of the production line 100 (line tact) was realized sufficiently (S103 of FIG. 5). In sum, the termination judging section 254 of the component allocating section 200 judges whether or not a termination condition of component allocation was satisfied. For example, in case that it was confirmed that, even if component movement (S101 of FIG. 5) and component exchange (S102 of FIG. 5) was carried out, line contact was not improved, or certain number of times of component movements and component exchanges were carried out, and so on, it judges that a termination condition of component allocation was satisfied.

FIG. 9 is a flow chart which shows a process of correspondences (inquiry and response) between the component allocating section 200 and the component mounting machines 101 through 102 in each processing (initial allocation, component movement, component exchange) shown in FIG. 5. In sum, it shows a common process which is repeated between the component allocating section 200 and the component mounting machines 101 through 102 in the above-described each processing.

The component allocating section 200 makes an inquiry of whether or not there is a restriction on mounting, to the component mounting machines 101 through 102 (S110) and thereby, confirms presence or absence of that restriction (S111). For example, on the occasion of allocating a certain component to a component mounting machine, whether or not that component mounting machine is capable of mounting that component is confirmed by making the inquiry to that component mounting machine. At this time, the component mounting machines 101 through 102 verify this inquiry with restriction conditions (the above-described absorption restriction, nozzle exchange restriction etc.) which are preliminarily held in an inside, and thereby, generate responses of whether it is mountable or not, and make the generated responses to the component allocating section 200.

Next, in case that it was confirmed that there is no restriction, the component allocating section 200 instructs concrete optimization to the component mounting machines 101 through 102 (S112), and thereby, obtains its result (tact) (S113). For example, on the occasion of allocating a certain component, it preliminarily obtains time necessary in case that that component was mounted (mounting tact). At this time, the component mounting machines 101 through 102 carry out optimization (or mounting simulation) of component mounting order, to this inquiry, and thereby, generate responses (calculate mounting time etc.), and make the generated responses to the component allocating section 200.

The component allocating section 200 updates the tact calculation table 241 over repeating the suchlike process, and thereby, carries out initial allocation, component movement, component exchange.

Next, a concrete example of component allocation including correspondences between the component allocating section 200 and the component mounting machines 101 through 102 as described above will be described. Here, as shown in FIG. 10(*a*), as to components which become objects for allocation, it is assumed that there are two components A, one component B, three components C, and one component D, and as shown in FIG. 10(*b*), it is assumed that there are two units of component mounting machines (the component mounting machines 101 and 102) which become objects for allocation. In this case, the component allocating section 200 prepares the tact calculation table 242 as shown in FIG. 10(*c*), i.e., a table in which it is possible to describe mounting time (or, information showing whether or not it is mountable) with respect to each component, in each component mounting machine as an object.

FIGS. 11 through 15 are views which show concrete examples of initial allocation (S100) in FIG. 5.

As shown in FIG. 11, the initial allocating section 251 firstly judges whether or not the component mounting machines 101 through 102 can mount each component, by a unit of component one type. In sum, the component allocating section 200 makes an inquiry of whether or not it is mountable as to each component A through D, to the component mounting machines 101 through 102, as shown in FIG. 11(*a*), and thereby, reflects its result on the tact calculation table 241, as shown in FIG. 11(*b*). Meanwhile, in FIG. 11(*b*), "T" shows that it is mountable, and "F" shows that it is non-mountable.

Subsequently, as shown in FIG. 12, the initial allocating section 251 calculates mounting tact with respect to each component type, as to components which were replied as mountable. In sum, the component allocating section 200 makes an inquiry of mounting tact as to each component which was replied as mountable, to the component mounting machines 101 through 102, as shown in FIG. 12(*a*), and thereby, reflects its result on the tact calculation table 241, as shown in FIG. 12(*b*). Meanwhile, numerical values, which are described in FIG. 12(*b*), show time necessary for a component mounting machine to mount all components of that type (mounting tact). For example, in FIG. 12(*b*), time, which is necessary for mounting two pieces of the components A by use of the component mounting machine 101, is 0.2 second.

Subsequently, as shown in FIG. 13, in case that a mountable component mounting machine is specified, the initial allocating section 251 carries out component allocation giving priority to that thing. Here, as understood from the tact calculation table 241 of FIG. 12(*b*), as to the component A, only the component mounting machine 101 can mount it, and as to the component D, only the component mounting machine 102 can mount it, and therefore, as shown in FIG. 13(*a*), the component A is allocated to the component mounting machine 101, and the component D is allocated to the component mounting machine 102. As a result of that, as shown in the tact calculation table 241 of FIG. 13(*b*), allocation as to the components A and D is terminated. Meanwhile, numerical values, which were surrounded by dotted line frames in the tact calculation table 241, show that prima facie allocation was terminated.

Subsequently, as shown in FIG. 14, the initial allocating section 251 studies allocation to the component mounting machine 101 with smaller tact, as to the component B to be allocated. Concretely speaking, as shown in FIG. 14(*a*), it studies whether or not the component mounting machine 101 can mount the components A and B, and in case that it can mount them, it obtains its mounting tact (mounting tact to all components which are composed of the components A and B). Here, it is understood that the component mounting machine 101 can mount only the component A or only the component B.

Then, in case of allocating the component B to the component mounting machine 101, in addition to the component A which has been already allocated to the component mounting machine 101, judged are restriction conditions of 1) whether there is such vacancy that the component B can be set, in a component supply section, 2) whether there is a nozzle which absorbs the component B, in a nozzle station (nozzle ST), and 3) incase that the nozzle, which was selected in the above-described 2), was attached to a head, whether that head can go to the above-described component absorbing section so as to absorb the component B by that head, and so on, and if it is judged that it can mount the component B, optimization simulation is carried out by use of components of total two types and three pieces, of two pieces of the components A and one piece of the component B. The nozzle station is a station for holding a replacement nozzle equipped with the mounting head. In case of replacing the nozzle, the mounting head is moved to the nozzle station, the nozzle no longer required is returned to the nozzle station, and a nozzle to be newly used is taken from the nozzle station and equipped with the mounting head.

Figures 13A, 13B:
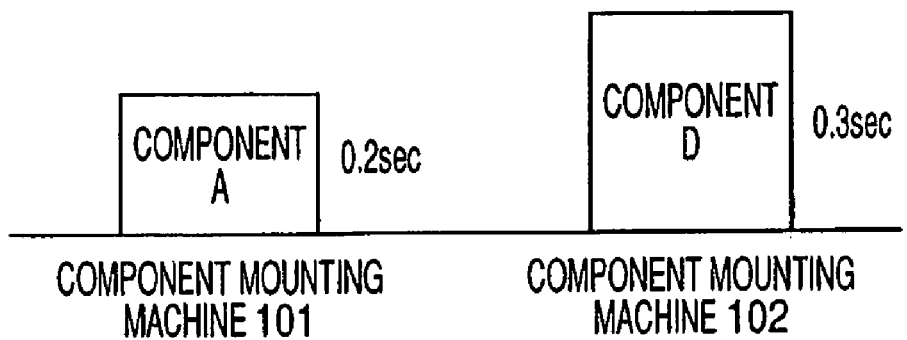
FIG. 13 is a view which shows a concrete example of initial allocation.

As shown in FIG. 13(b), simulation tact of two pieces of the components A is 0.2 second, and simulation tact of one piece of the component B is 0.15 second, but total simulation tact does not necessarily become 0.35 second (=0.2 second+0.15 second). It is because it does not become such one that mounting time of each component was simply added, since moving time of a mounting head to an absorption point, moving time to a recognition point, moving time to a mounting position, etc. are also considered. Here, it is assumed that total simulation tact became 0.4 second. This tact calculation is applied to a component mounting machine with a type of mounting components while a mounting head having a plurality of nozzles is moving in XY directions (hereinafter, modular machine), but an application object of the invention is not limited to the modular machine, as a matter of course, and it is also applied to another mounting machine, such as a type of mounting components while a mounting head is rotating (hereinafter, rotary machine), and a type of mounting components while a mounting head moves in XY directions, which corresponds to mounting of relatively large size electronic components, irregular shape components, IC components, etc. (hereinafter, multiple function machine).

Since mounting simulation tact was 0.4 second, the initial allocating section 251 allocates the component B to the component mounting machine 101, as shown in FIG. 14(b), and updates the tact calculation table 241 as shown in FIG. 14(c).

Meanwhile, as understood by comparing with FIG. 13(b), the reason why mounting tact of the components A and B by the component mounting machine 101 in the tact calculation table 241 of FIG. 14(c) has been changed (as to the component A, 0.2→0.26 second, and as to the component B, 0.15→0.13 second) is that mounting tact (0.4 second) in case that both of the components A and B were mounted was prorated by the number of components, in accordance with the following formulas.

Mounting tact of the component $A=0.4\times2$(the number of the component $A$)/3(the number of the components $A$ and $B$)=0.26(second).

Mounting tact of the component $B=0.4\times1$(the number of the component $B$)/3(the number of the components $A$ and $B$)=0.13(second).

Subsequently, as shown in FIG. 15, the initial allocating section 251 studies allocation to the component mounting machine 102 with smaller tact, as to the last component C to be allocated. Concretely speaking, as shown in FIG. 15(a), it studies whether or not the component mounting machine 102 can mount the components A and B, and in case that it can mount them, it obtains its mounting tact (mounting tact to all components of the components C and D). Here, the component mounting machine 102 can mount the components C and D, and its mounting tact was 1.5 second, and therefore, the initial allocating section 251 allocates the component C to the component mounting machine 102, as shown in FIG. 15(b), and updates the tact calculation table 241 as shown in FIG. 15(c).

Meanwhile, as understood by comparing with FIG. 14(c), the reason why mounting tact of the components C and D by the component mounting machine 102 in the tact calculation table 241 of FIG. 15(c) has been changed is that mounting tact (1.5 second) in case that both of the components C and D were mounted was prorated by the number of components.

In this manner, initial allocation of all components A through D by the initial allocating section 251 is completed, and subsequently, the component moving section 252 realizes leveling of tact by component movement.

FIG. 16 is a view which shows a concrete example of component movement (S101) in FIG. 5. Here, in order to further equalize a state of initial allocation shown in FIG. 15(b), the component moving section 252 studies to move the component C, which was allocated to the component mounting machine 102 with larger tact, to the component mounting machine 101 with smaller tact.

Figure 16A:
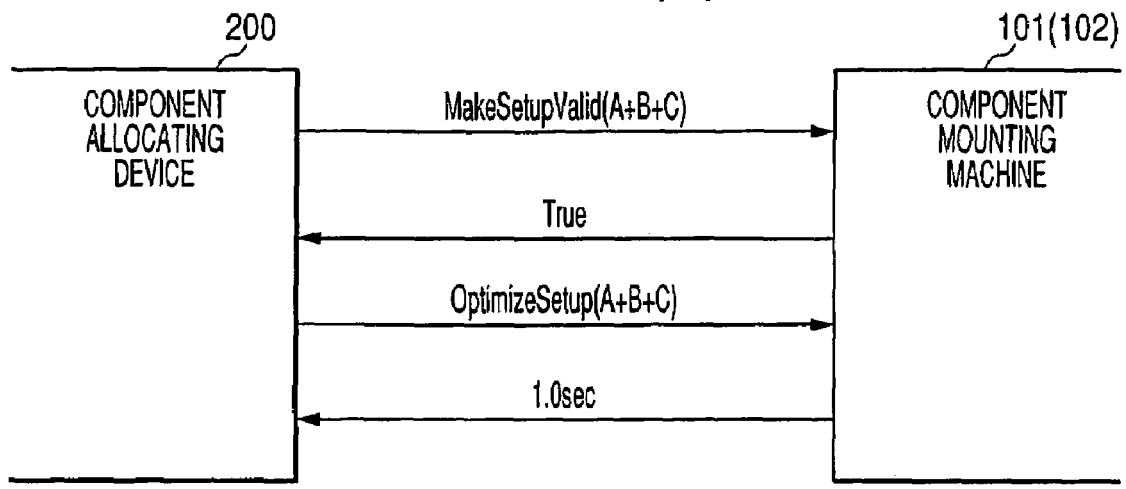
FIG. 16 is a view which shows a concrete example of component movement.

Concretely speaking, in order to study a state after movement, firstly as shown in FIG. 16(a), it studies whether or not the component mounting machine 101 can mount the components A, B and C, as shown in FIG. 16(a), and in case that it can mount them, it obtains its mounting tact (mounting tact to all components which are composed of the components A, B and C). Here, the component mounting machine 101 can mount the component A, B and C, and obtains its mounting tact 1.0 second.

Figure 16B:
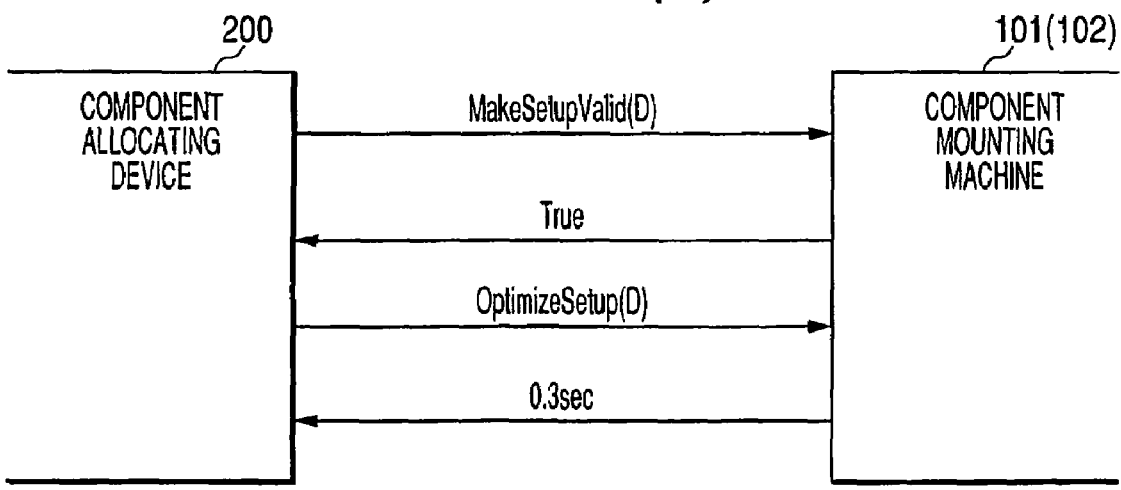

In the same manner, as shown in FIG. 16(b), it studies whether or not the component mounting machine 102 can mount only the component D, and in case that it can mount it, it obtains its mounting tact. Here, the component mounting machine 102 can mount only the component D, and obtains its mounting tact 0.3 second.

Figure 16C:
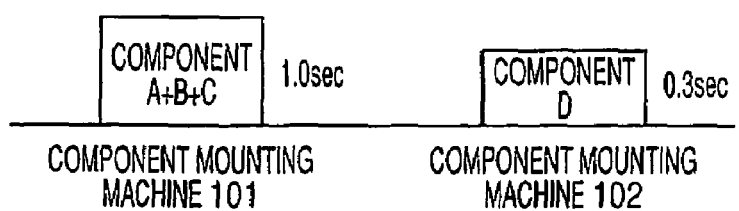

As a result of that, it is understood that line tact is reduced from 1.5 second to 1.0 second, and therefore, the component moving section 252 moves the component C from the component mounting machine 102 to the component mounting machine 101, as shown in FIG. 16(c). By this means, as understood by comparing FIG. 15(b) and FIG. 16(c), line tact is to be more equalized.

As above, the component allocating section 200 carries out component allocation over communicating with respective component mounting machine 101 through 102, via a common interface (API), and thereby, it is possible to carry out unbroken and highly equalized component allocation, without preliminarily keeping information inherent in respective component mounting machine 101 through 102. In sum, even in case that a component mounting machine of a new type joins in a component mounting line and it is intended for a component mounting line in which component mounting machines of various types are mixed, equalization of line contact is precisely realized while individual component mounting machines are made to carry out restriction confirmation and individual optimization, and therefore, it is possible to surely carry out highly equalized component allocation.

The above-described component allocating section 200 may be disposed in any one of the printing machine 120, the coating machine 130, the component mounting machines 101, 102, the reflow machine 140, which configure the production line 100, and may be disposed in a plurality of them and one of them may be operated.

Firstly, such a case that it is disposed in any one of devices which configure a production line will be described. In this case, processing of the component allocating section has the component mounting machines 101, 102 executed optimization, and carries out component allocation processing (optimization of line balance). Therefore, in order to carry out processing of component allocation and processing of optimization of the device itself (hereinafter, referred to as simple body optimization) at the same time, there is such a possibility that excessive burden is loaded to CPU (arithmetic processing section) of that device.

Therefore, it is desirable that the component allocating section 200 is disposed in a device which does not carry out the simple body optimization and is operated. As the device which does not carry out the simple body optimization, cited are the printing machine 120 and the reflow machine 140. By disposing the component allocating section 200 in the printing machine 120 and the reflow machine 140, component allocation processing is assigned to a device which has relatively a room in processing ability of CPU, and it is possible to realize a line balance control system which does not require a higher-level device.

Next, such a case that the component allocating section 200 was disposed in at least two or more devices among devices which configure the production line 100 will be described. Meanwhile, in this embodiment, such a case that the component allocating section 200 is disposed in all devices of the printing machine 120, the coating machine 130, the component mounting machines 101, 102, and the reflow machine 140, which configure the production line 100 will be described.

In this case, a plurality of devices which configure the production line have the component allocating sections, and one device among them carries out component allocation processing to component mounting machines.

Figure 17:
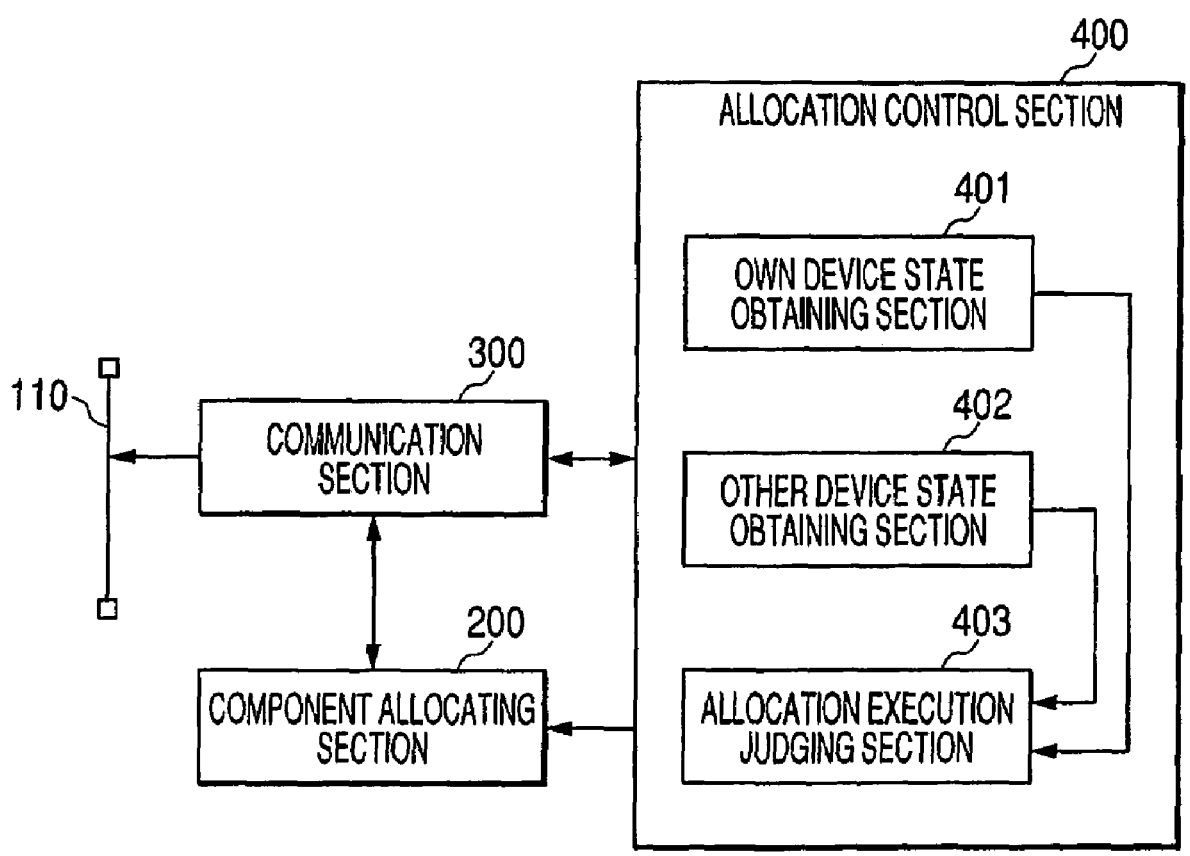
FIG. 17 is a schematic block diagram which explains a portion relating to line balance control in devices which configure a production line.

FIG. 17 is a schematic block diagram which explains a portion relating to line balance control in devices which configure a production line. A communication section 300 is connected to a communication line 110, and carries out information communication with other devices. An allocation control section 400 is equipped with an own device state obtaining section 401 which obtains a state of an own device, an other device state obtaining section 402 which obtains a state of another device through the communication section 300, and an allocation execution judging section 403 which judges whether or not an own device should carry out allocation processing. The component allocating section 200 carries out component allocation processing in case that it was judged by the allocation control section 400 that an own device should carry out allocation processing.

Figure 18:
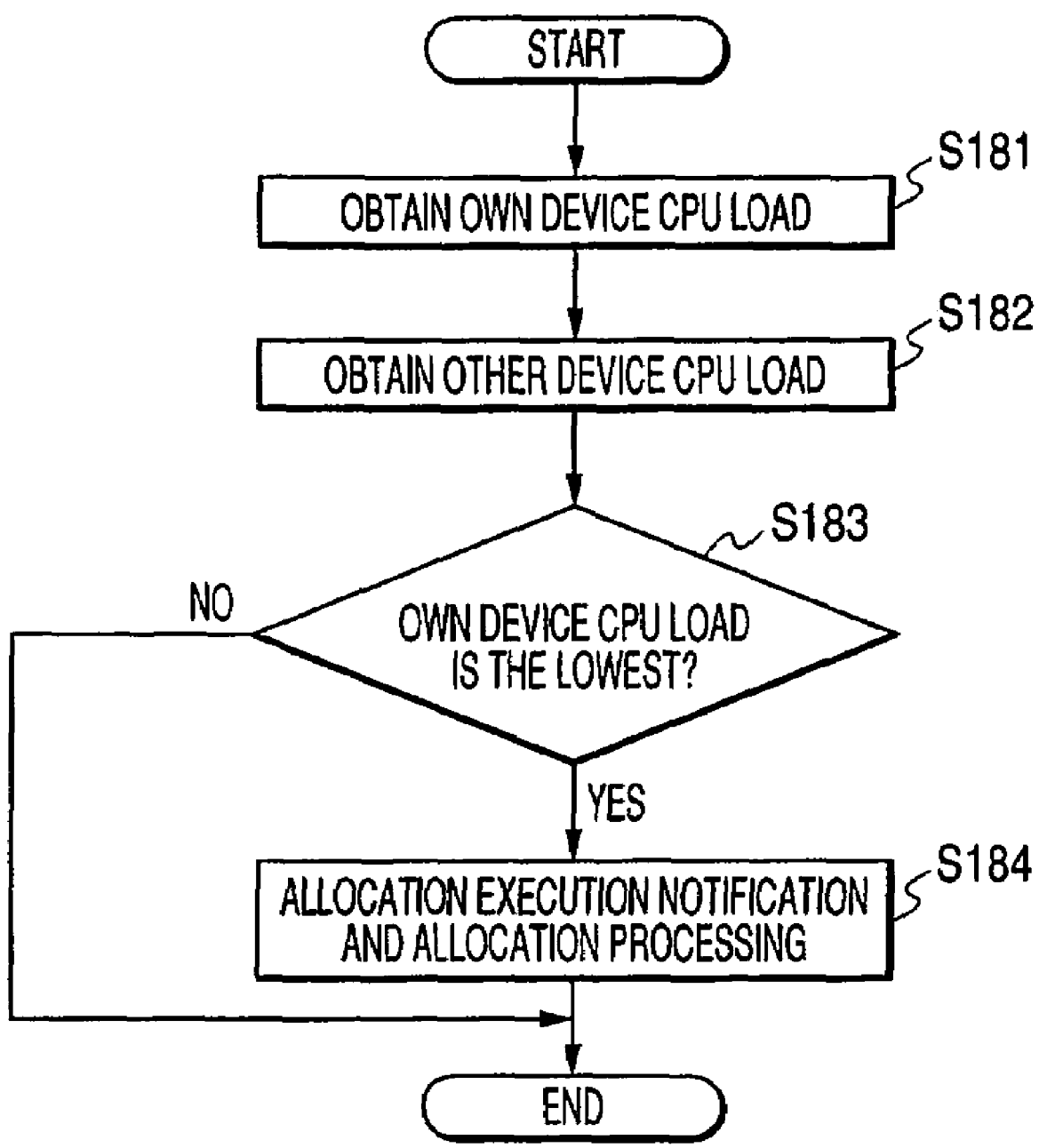
FIG. 18 is a flow chart which shows processes for deciding a device which carries out component allocation by use of CPU load information.

FIG. 18 is a flow chart which shows processes for deciding a device which carries out component allocation by use of CPU load information. Firstly, in the own device state obtaining section 401, own device CPU load is obtained (S181). Then, the other device state obtaining section 402 obtains other device CPU load from other devices through the communication line 110 and the communication section 300 (S182).

Meanwhile, as an obtaining method of this other device CPU load, it may be obtained by receiving one which was voluntarily sent from other devices, and it may be obtained by the other device state obtaining section 402 making an inquiry to other devices at predetermined cycles and receiving a response thereof. In addition, an own device state, which was obtained in response to an inquiry from other devices, or voluntarily, is notified to other devices. In this manner, each device, which configure a production line, can take hold of all CPU loads of an own device and other devices.

Next, the allocation execution judging section 403 compares the obtained own device CPU load and other device CPU load, and judges whether the own CPU load is the lowest or not (S183). In case that the own device CPU load is the lowest, the allocation execution judging section 403 judges that an own device carries out component allocation to component mounting machines, and prevents competition of component allocation by notifying to other devices through the communication section 300 that the own device carries out component allocation, and instructs execution of allocation processing to the component allocating section 200 (S184).

Figure 19:
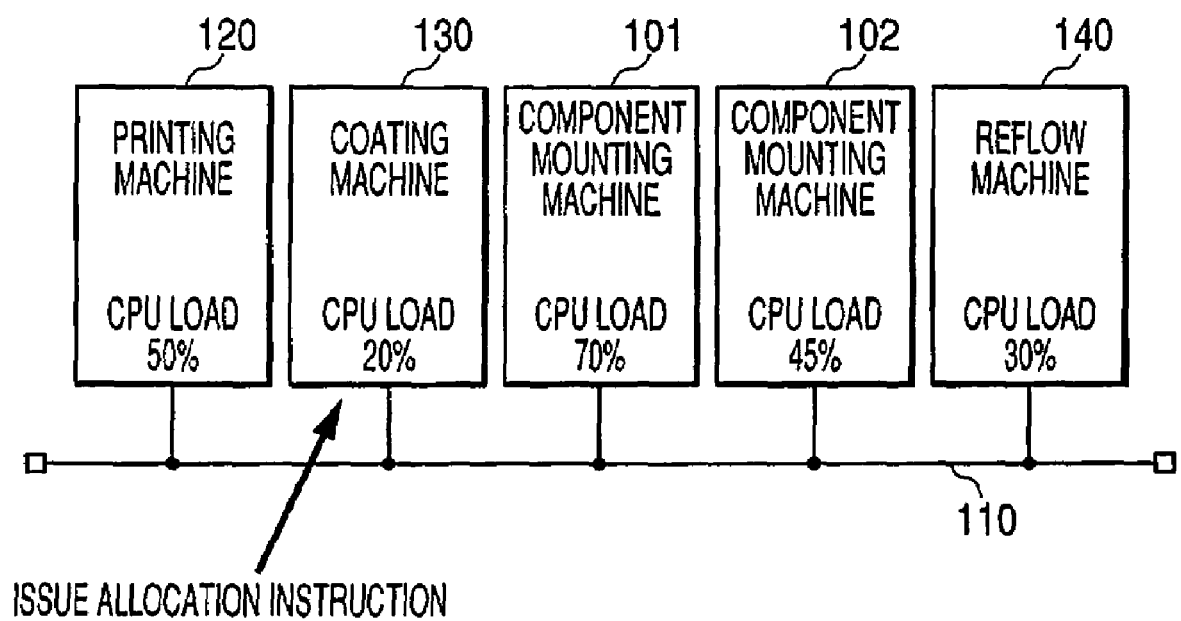
FIG. 19 is an explanatory view which shows an example of such a case that a device for carrying out an allocation instruction was decided by use of CPU load.

FIG. 19 is an explanatory view which shows an example of such a case that a device for carrying out an allocation instruction was decided by use of CPU load. As shown in FIG. 19, the coating machine 130 with the lowest CPU load issues an allocation instruction. By this means, by assigning a role of carrying out an allocation instruction to a device in which CPU load is the lowest, i.e., which has the largest room in processing ability of CPU, it is possible to prevent delay of processing due to such a fact that processing of that allocation instruction was added, at the time of component allocation.

Figure 20:
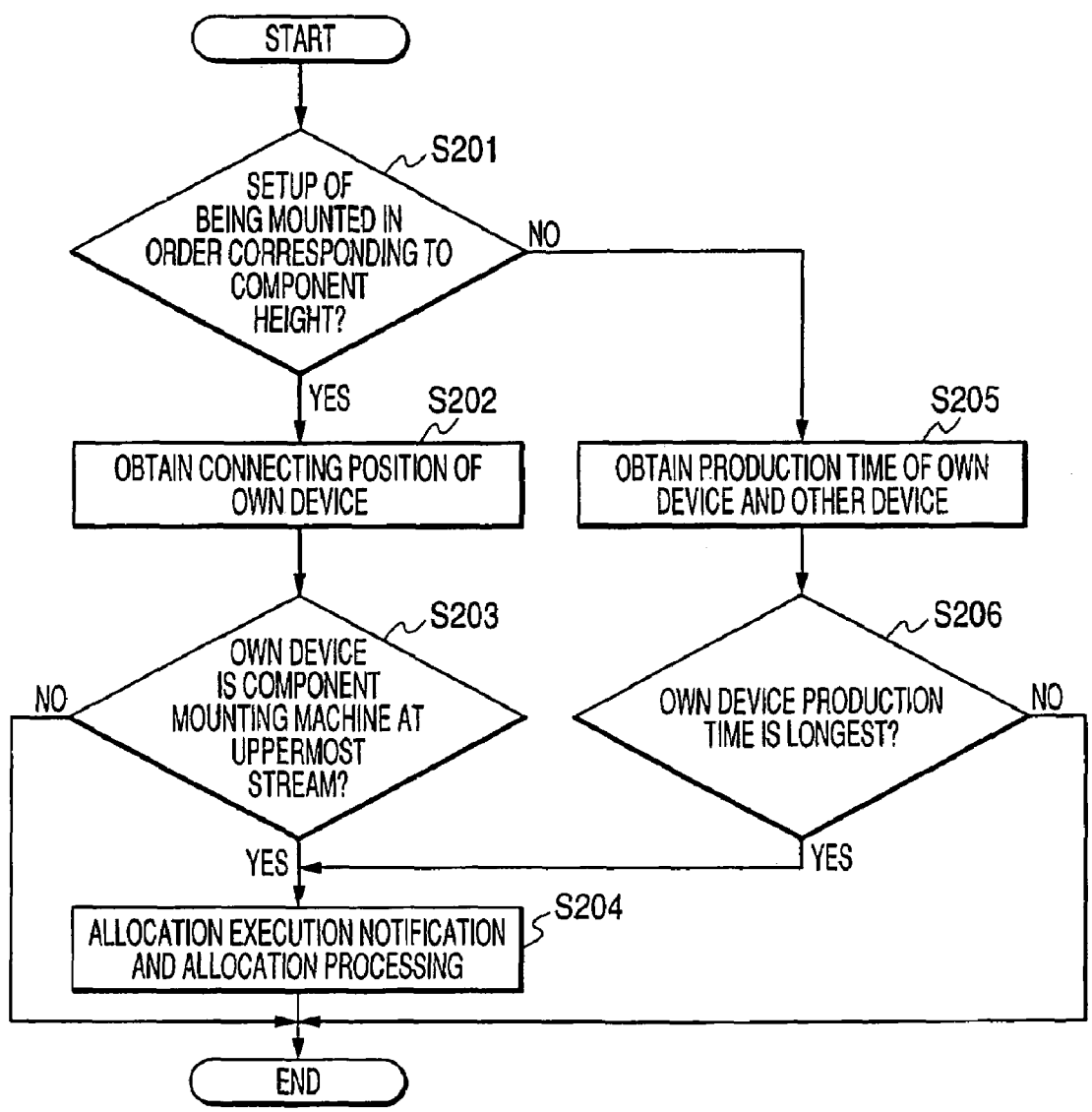
FIG. 20 is a flow chart which shows another example of a process for deciding a device which carries out component allocation.

FIG. 20 is a flow chart which shows another example of a process for deciding a device which carries out component allocation. Firstly, as restriction of component mounting, it is judged whether there is such restriction in the order of component mounting by the component mounting machines 101, 102 that components are mounted in the order corresponding to component height (S201). Then, in case of mounting in the order corresponding to component height, communication is carried out with other devices, and a connecting position of an own device is obtained (S202).

Then, in case that an own device is a component mounting machine at the uppermost stream (YES of S203), the allocation execution judging section 403 judges that the own device becomes a leader to carry out component allocation, and it is notified to other devices through the communication section 300 that the own device becomes a leader, and execution of allocation processing is instructed to the component allocating section 200. In case that the own device is not the component mounting machine at the uppermost stream (NO of S203), processing of deciding a device which carries out component allocation is terminated. That is, the own device does not carry out allocation processing.

In S201, in case that the order of component mounting is not the order of component height (NO of S201), the own device state obtaining section 401 and the other device state obtaining section 402 obtain production time of the own device and other device, respectively (S205). Then, in case that the own device is a component mounting machine with the longest production time (YES of S206), it goes to S204, and the own device carries out component allocation. It is because it is suitable for carrying out allocation, since the component mounting machine with the longest production time is in a position for moving components to another mounting machine. On one hand, in case that the own device is not the component mounting machine with the longest production time (NO of S206), processing of deciding a device which carries out component allocation is terminated.

Figure 21:
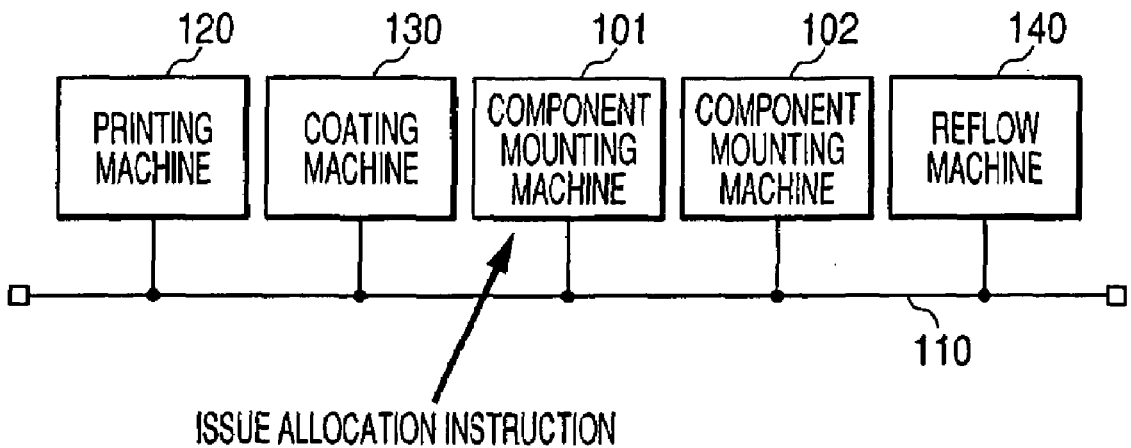
FIG. 21 is an explanatory view which shows an example in case that a device, which issues an allocation instruction in case that there was a mounting instruction in the order corresponding to component height, was decided, as a rule of component mounting.

FIG. 21 is an explanatory view which shows an example in case that a device, which issues an allocation instruction in case that there was a mounting instruction in the order corresponding to component height, was decided, as a rule of component mounting.

In case that there was an instruction (setup) of mounting components on a substrate in the order corresponding to component height, a plurality of component mounting machines are to take charge of mounting of components with different heights stepwise, in the order corresponding to its connection on a production line. Therefore, as an allocating method of, components, it is one of effective allocating method to follow a procedure of sequentially allocating them in the order corresponding to component height, from the uppermost stream or the lowermost stream of component mounting machines in a production line.

For example, such a case that it is setup to mount components on a substrate, in the order corresponding to one of lower component height (smaller component thickness) will be described.

In this case, there is need to mount components in the order corresponding to one of lower component height sequentially, in sequence from a component mounting machine at an upstream side. Therefore, when the above-described component allocating method is used, firstly conceivable is a method of allocating components of lower component height, from a component mounting machine at the uppermost stream. In this case, if the component mounting machine at the uppermost stream becomes a device which issues an allocation instruction, this component mounting machine at the uppermost stream can carry out allocation processing to component mounting machines at a downstream side sequentially, starting with component allocation of an own device. It is because the component mounting machine at the uppermost stream is suitable for carrying out allocation, since it is in a position of moving components to another mounting machine.

FIG. 21 shows such a case that the component mounting machine at the uppermost stream becomes a device which issues an allocation instruction, and the component mounting machine 101 becomes the device which issues an allocation instruction.

In addition, to mount components in the order corresponding to lower component height sequentially means, in other words that there is need to mount components with higher component height, to component mounting machines at the more downstream, side. Therefore, as a component allocating method, also conceivable is a method of allocating components in sequence from components with higher component height, in a direction opposite to the above-described example. In this case, by allocating them from a device at a downstream side, it is possible to carry out allocation processing sequentially, toward the upstream side, with respect to each component mounting machine. In this case, if the component mounting machine at the lowermost stream becomes the device which issues an allocation instruction, this component mounting machine at the lowermost stream can carry out allocation processing to component mounting machines at the upstream side sequentially, starting with component allocation of an own device, and therefore, it is possible to carry out component allocation processing effectively. Meanwhile, in the case of FIG. 21, the component mounting machine 102 becomes the device which issues an allocation instruction.

Figure 22:
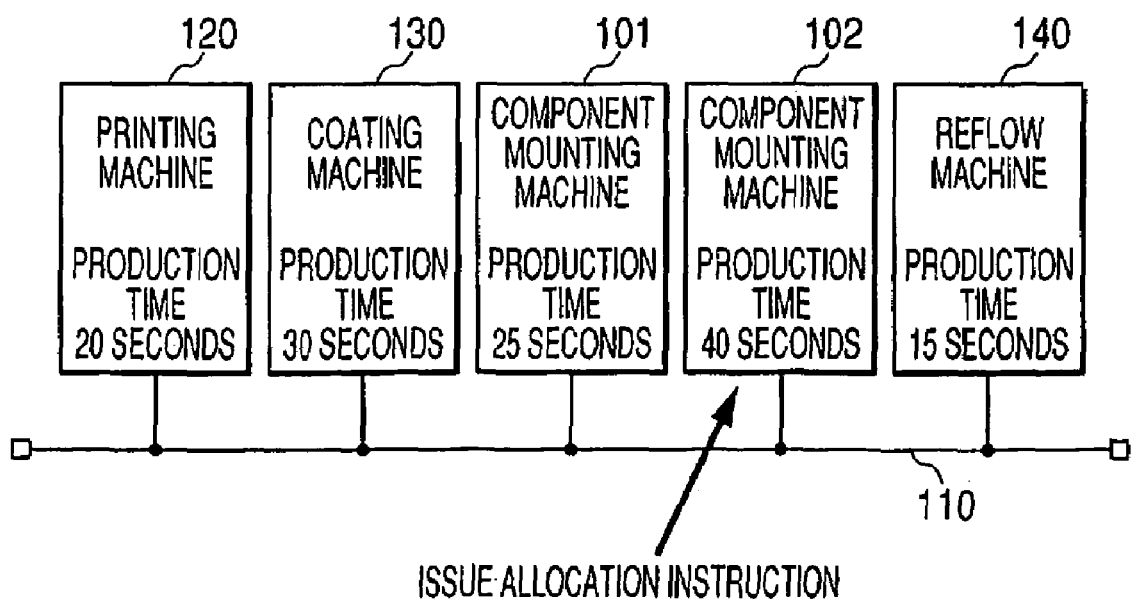
FIG. 22 is an explanatory view which shows an example of such a case that the device, which issues an allocation instruction, was decided by use of production time.

FIG. 22 is an explanatory view which shows an example of such a case that the device, which issues an allocation instruction, was decided by use of production time. As shown in FIG. 22, judging from respective production time, the component mounting machine 102, which is a device with the longest production time, among component mounting machines, becomes the device which issues an allocation instruction. By reducing production time of the device with the longest production time, it becomes possible to reduce production time of an entire line. It can be said that the component mounting machine with the longest production time is the busiest component mounting time, and therefore, that component mounting machine becomes the device which issues an allocation instruction, and thereby, it is possible to carry out such flexible adjustment of line balance that an allocation instruction was issued from a busy device to a device having a room. Meanwhile, the device with the longest production time may be set as the device which issues an allocation instruction, without limiting to a component mounting machine.

Meanwhile, in the examples shown in FIGS. 20 and 22, the component mounting machine with the longest production time becomes the device which issues an allocation instruction, but a component mounting machine with the shortest production time may be assigned as the device which issues an allocation instruction. It can be said that the component mounting machine with the shortest production time is a component mounting machine having the largest room, and therefore, that component mounting machine becomes the device which issues an allocation instruction, and thereby, it is possible to carry out such flexible adjustment of line balance that it is possible to assume components to be mounted, from another component mounting machine. In this case, in FIG. 22, the component mounting machine 101 becomes the device which issues an allocation instruction. Meanwhile, the device with the shortest production time may be set as the device which issues an allocation instruction, without limiting to a component mounting machine.

According to the suchlike first embodiment of the invention, a device which configures a production line is equipped with a function of controlling line balance, and therefore, it becomes possible to provide line balance control method and apparatus which do not require a higher-level device.

Meanwhile, in this embodiment, it was judged whether or not each device carries out allocation processing, upon taking hold of all information of own device and other device in devices which are included in a production line, but a certain specific device, which is included in the production line, may decide a device which carries out allocation processing. For example, when the device which decides allocation processing is a printing machine, the printing machine takes hold of information of all devices, and in case that the example shown in FIG. 19 was realized, it is also all right even if the printing machine decides that the coating machine becomes an allocating device, to issue an instruction to the coating machine so as to carry out allocation processing.

In addition, the device, which carried out allocation processing, may decide a device which carries out next allocation processing. For example, it is all right even if a device, which was set as allocation processing, takes hold of information of all devices, and on the basis of that information, instructs a device which carries out next allocation processing, to execute an allocation instruction.

At any rate, it is all right if one device among them has a configuration so as to carry out control of line balance, on the basis of information of each device, in accordance with a predetermined condition.

Second Embodiment

In the first embodiment, allocation of components is to be carried out by an interactive mode between an apparatus and component mounting machines. However, line balance control according to the first embodiment is a sort of simulation in which it is carried out by use of data which has been already obtained prior to actual production start. Therefore, generation etc. of various phenomena after the actual production start, e.g., errors due to component shortage etc. are not considered. In order to accomplish more accurate line balance, there is need to consider circumstances in an actual production process. The second embodiment of the invention is designed to carry out line balance control reflecting an actual condition of each component mounting machine in a state after start of actual production.

Figure 23:
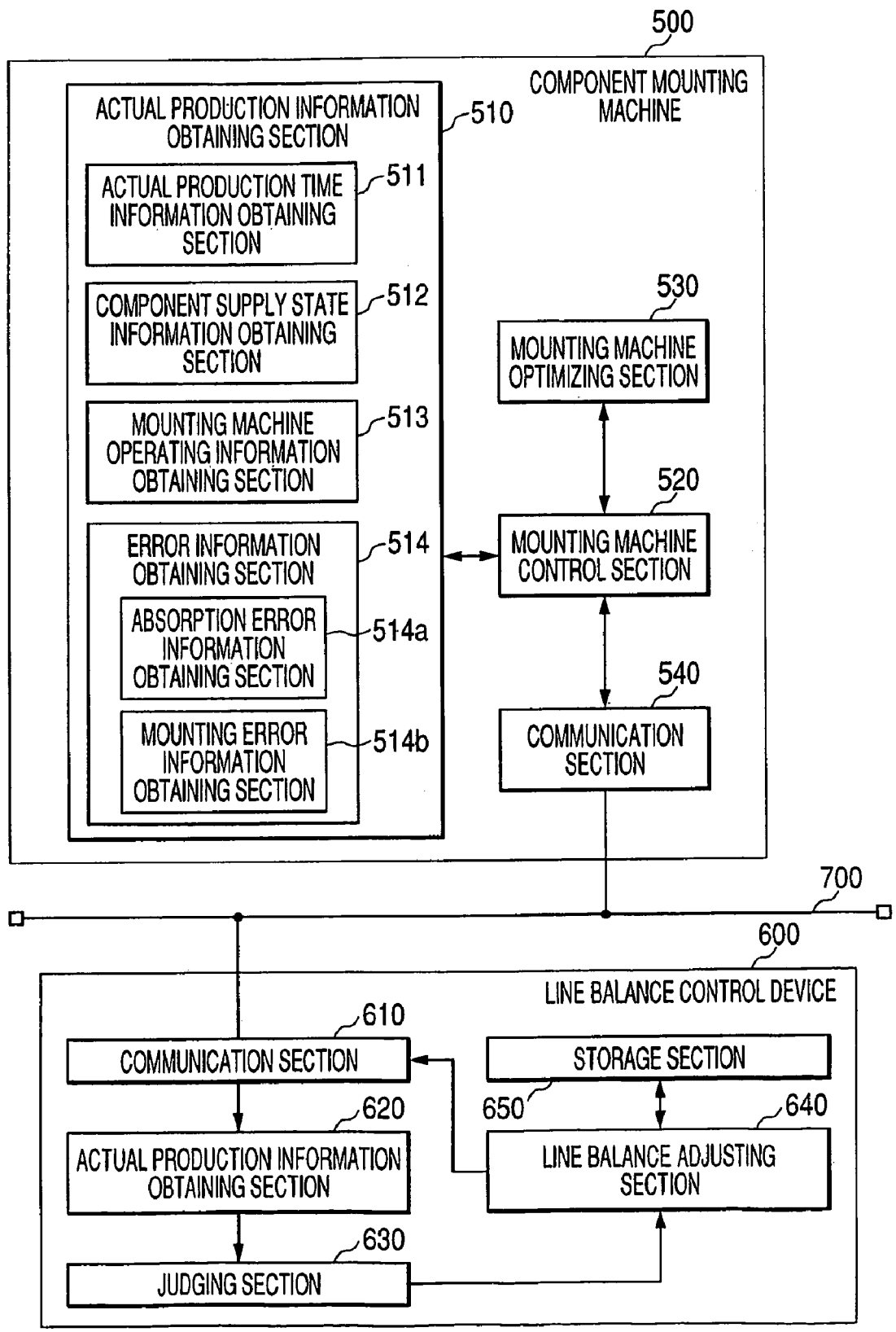
FIG. 23 is a schematic block diagram which shows a component mounting machine and a line balance control device for explaining a second embodiment of the invention.

FIG. 23 is a schematic block diagram which shows a component mounting machine and a line balance control device for explaining the second embodiment of the invention. This embodiment is also a production line including a plurality of component mounting machines, in the same manner as in the first embodiment.

As shown in FIG. 23, a component mounting machine 500, and a line balance control device 600 are connected through a communication line 700. Here, the line balance control device 600 may be disposed independently in a device (e.g., computer) etc. separated from the production line, and may be disposed in a device which configures the production line, in the same manner as in the first embodiment.

The component mounting machine 500 is equipped with an actual production information obtaining section 510, a mounting machine control section 520, a mounting machine optimizing section 530, and a communication section 540. The actual production information obtaining section 510 is one which obtains information of a component mounting machine after actual production start, i.e., after the component mounting machine 500 starts operation actually, and has an actual production time information obtaining section 511, a component supply state information obtaining section 512, amounting machine operating information obtaining section 513, and an error information obtaining section 514.

The actual production time information obtaining section 511 obtains such a value that production time of component mounting in that component mounting machine 500, e.g., production time per one substrate was calculated. As this value showing production time, an average value with respect to each predetermined time or with respect to each predetermined number of substrates may be used, and a value, which is updated as needed with respect to each substrate, may be used.

The component supply state information obtaining section 512 is one which detects an inventory status of components in a component supply section in which components are placed, in the component mounting machine 500, and for example, detects component shortage which is such a state that components in a certain component supply section run out.

The mounting machine operating information obtaining section 513 detects' such a state that the component mounting machine 500 does not carry out a mounting work of components due to maintenance and malfunction (such a state that only a belt conveyer of conveying substrate is operating) etc.

The error information obtaining section 514 has an absorption error information obtaining section 514a and a mounting error information obtaining section 514b. The absorption error information obtaining section 514a obtains absorption error information including frequency in case that there occurred an error on the occasion of absorbing a component from a component supply section by an absorbing nozzle of a mounting head, a component as to which that error occurred, a position of the component supply section, etc. In addition, the absorption error information obtaining section 514b obtains information regarding a component mounting error to a substrate, such as frequency of errors, a type of a component, and a position of a mounting point. It is all right if the error information obtaining section 514 has any one of these absorption error information obtaining section 514a and mounting error information obtaining section 514b. In addition, it may obtain error information regarding other various component mounting.

The mounting machine control section 520 carries out control of the actual production information obtaining section 510, the mounting machine optimizing section 530, and the communication section 540.

The mounting machine optimizing section 530 carries out optimization (simple body optimization) of a mounting machine on the basis of an instruction from the mounting machine control section 520. The communication section 540 carries out communication with other devices through the communication line 700.

The line balance control device 600 is equipped with a communication section 610, an actual production information obtaining section 620, a judging section 630, a line balance adjusting section 640, and a storage section 650.

The communication section 610 carries out communication with other devices through the communication line 700 The actual production information obtaining section 620 obtains actual production information, which the actual production information obtaining section 510 of the component mounting machine 500 obtained, through the communication section 540, the communication line 700, and the communication section 610. The judging section 630 carries out judgment of whether or not line balance control is necessary on the basis of the obtained actual production information.

The line balance adjusting section 640 carries out adjustment processing of line balance such as component allocation processing etc. to a plurality of component mounting machines 500, in case that the judging section 630 judged that line balance control is necessary. As one example of processing of this line balance adjusting section 640, for example, cited is processing of the optimization processing section 250 of the component allocating section 200 in the first embodiment. The storage section 650 stores information for line balance control, and for example, stores the tact calculation table 241 etc. of the component allocating section 200 in the first embodiment.

Figure 24:
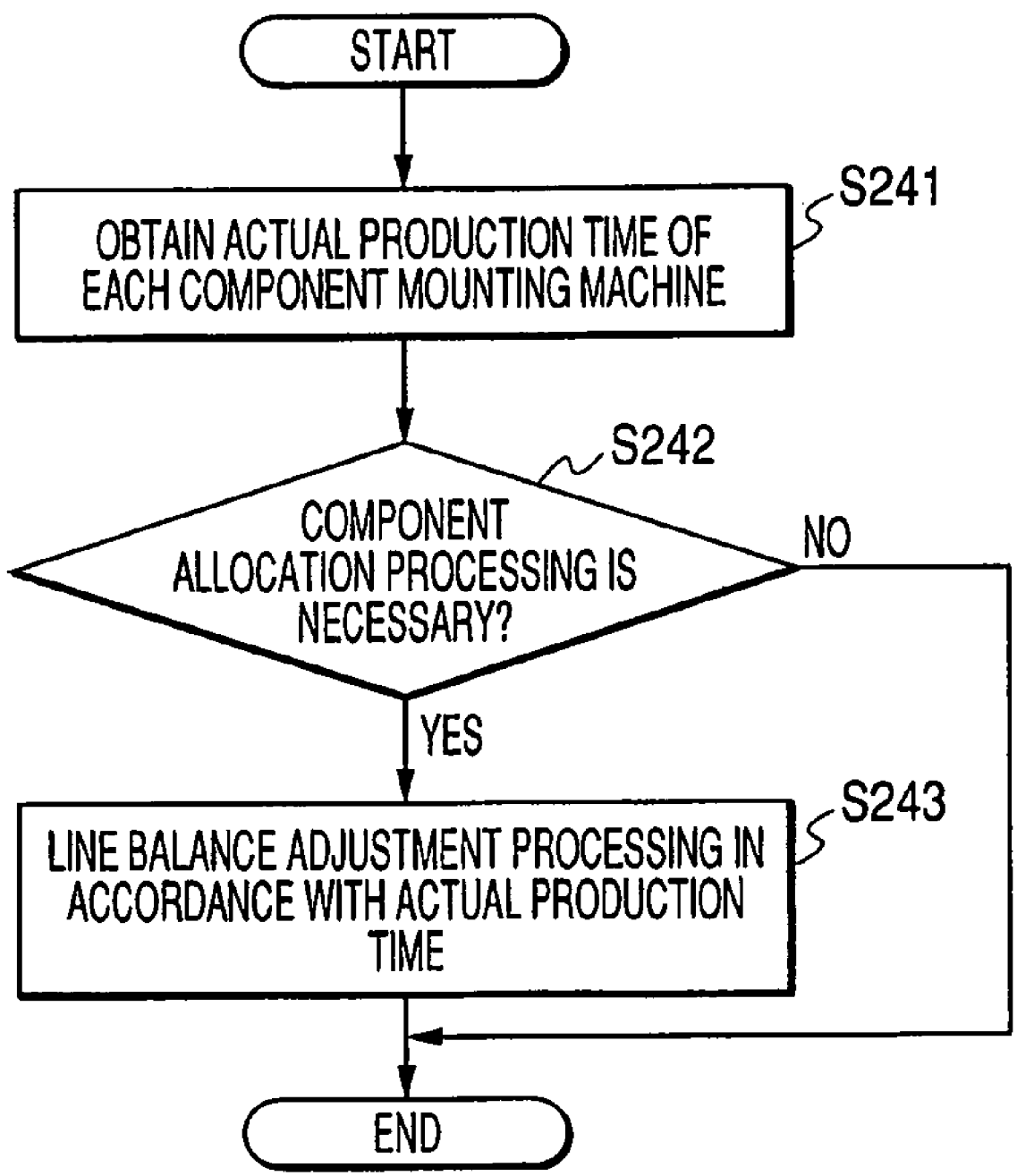
FIG. 24 is a flow chart which shows processing of a line balance control device by use of actual production time.

Next, a case of carrying out line balance control processing by use of actual production time of each component mounting machine as actual production information will be described. FIG. 24 is a flow chart which shows processing of a line balance control device by use of actual production time.

As shown in FIG. 24, firstly, the actual production information obtaining section 620 obtains actual production time of the component mounting machine 500 (S241). As an obtaining method of this actual production time, it is possible to use various obtaining methods such as a method of receiving and obtaining information which is voluntarily notified by the component mounting machine 500, and such a method that the actual production information obtaining section 620 makes an inquiry to the component mounting machine 500, for example, at predetermined intervals, and obtains actual production time as its response.

Next, the judging section 630 judges whether or not allocation processing of components is necessary on the basis of the obtained actual production time (S242). As an example of this judgment standard, cited are such a case that there is a actual production time difference of predetermined time or more between component mounting machines, and such a case that an error of a predetermined value or more appeared between virtual production time of each component mounting machine which is obtained by calculation such as production time which was obtained at the time of optimization simulation, and actual production time.

Then, in case that it was judged that component allocation processing is necessary (YES of S242), the line balance adjusting section 640 carries out control processing of line balance in response to the obtained actual production time, and then, issues an instruction to a component mounting machine which becomes an object for line balance control (S243). On one hand, in case that it was judged that component allocation processing is not necessary (NO of S242), control of line balance is unnecessary, and processing is terminated.

Here, as one example of line balance adjustment processing, a method of making an inquiry of component allocation possibility to each component mounting machine is applicable, like the component allocating method in the first embodiment. According to this method, it is possible to carry out unbroken component allocation without need to preliminarily keep information specific to each component mounting machine.

In this regard, however, in the component allocating method of the first embodiment, virtual production time is used, and therefore, in this embodiment, virtual production time as a result of simple body optimization, and actual production time obtained in S241 are compared (e.g., an error is calculated), to estimate actual production time with respect to each component, and on the basis of that production time which was found out, equalization processing is carried out. By this means, it is possible to carry out control of line balance in accordance with actual production time.

FIG. 25 is a view which shows another example of line balance adjustment processing. As shown in FIG. 25, a substrate 40 has a plurality of (eight in FIG. 25) identical mounting patterns "a". This substrate is called as a multi-chamfer substrate, and is one which is difficult to be manufactured since it as a simple body is small, and which is produced as one substrate by disposing a plurality of patterns side by side thereon.

Figure 25A:
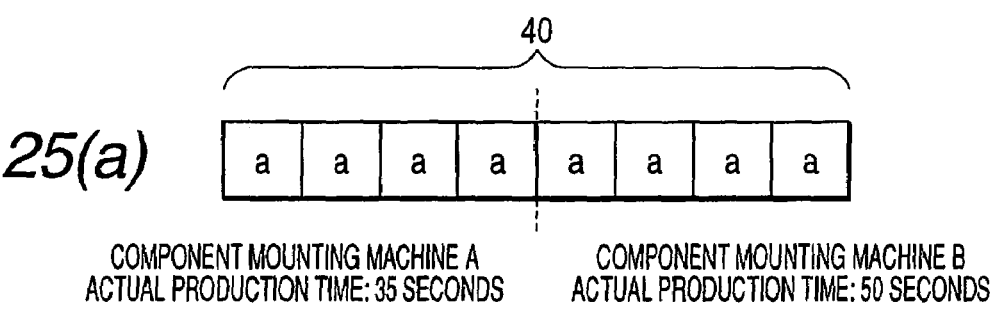
FIG. 25 is a view which shows another example of line balance adjustment processing.

Here, as shown in FIG. 25(a), it is assumed that, at first, a component mounting machine A is in charge of component mounting of left side four patterns of the substrate 40, and a component mounting machine B is in charge of component mounting of right side four patterns "a" of the substrate 40. However, in case that actual production time of the component mounting machine A, which was obtained in S241, is 35 seconds and actual production time of the component mounting machine B is 50 seconds, there occurs a big difference in production time between both sides.

Figure 25B:
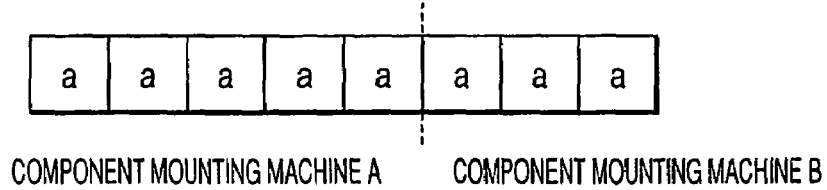

Then, in case that this difference becomes a baseline or more for judging that line balance control is necessary (YES of S242), a change of patterns which respective component mounting machines are in charge of is carried out in accordance with this actual production time. As to this, as shown in FIG. 25(b), it has been changed for the component mounting machine A to take charge of component mounting of left side five patterns "a", and for the component mounting machine B to take charge of right side three patterns of the substrate 40.

As this adjusting method of patterns, for example, there is a method of carrying out allocations of the number of patterns which are in charge, in accordance with a ratio of actual production time between component mounting machines. In addition, such processing that the number of patterns of a component mounting machine with longer actual production time is reduced only by predetermined number, and the number of patterns which a component mounting machine with shorter actual production time takes charge of is increased, and a difference in actual production time between component mounting machines is reduced may be carried out.

In addition, a substrate, which becomes an object for a change of patterns in charge, is not limited to the multi-chamfer substrate, and other various substrates can become objects. Furthermore, as an adjusting method of patterns, adjustment of pattern number was described, but in case that a plurality of pattern types are included, it is desirable to carry out adjustment, taking a relation of types of these patterns and production time into consideration.

Figure 26:
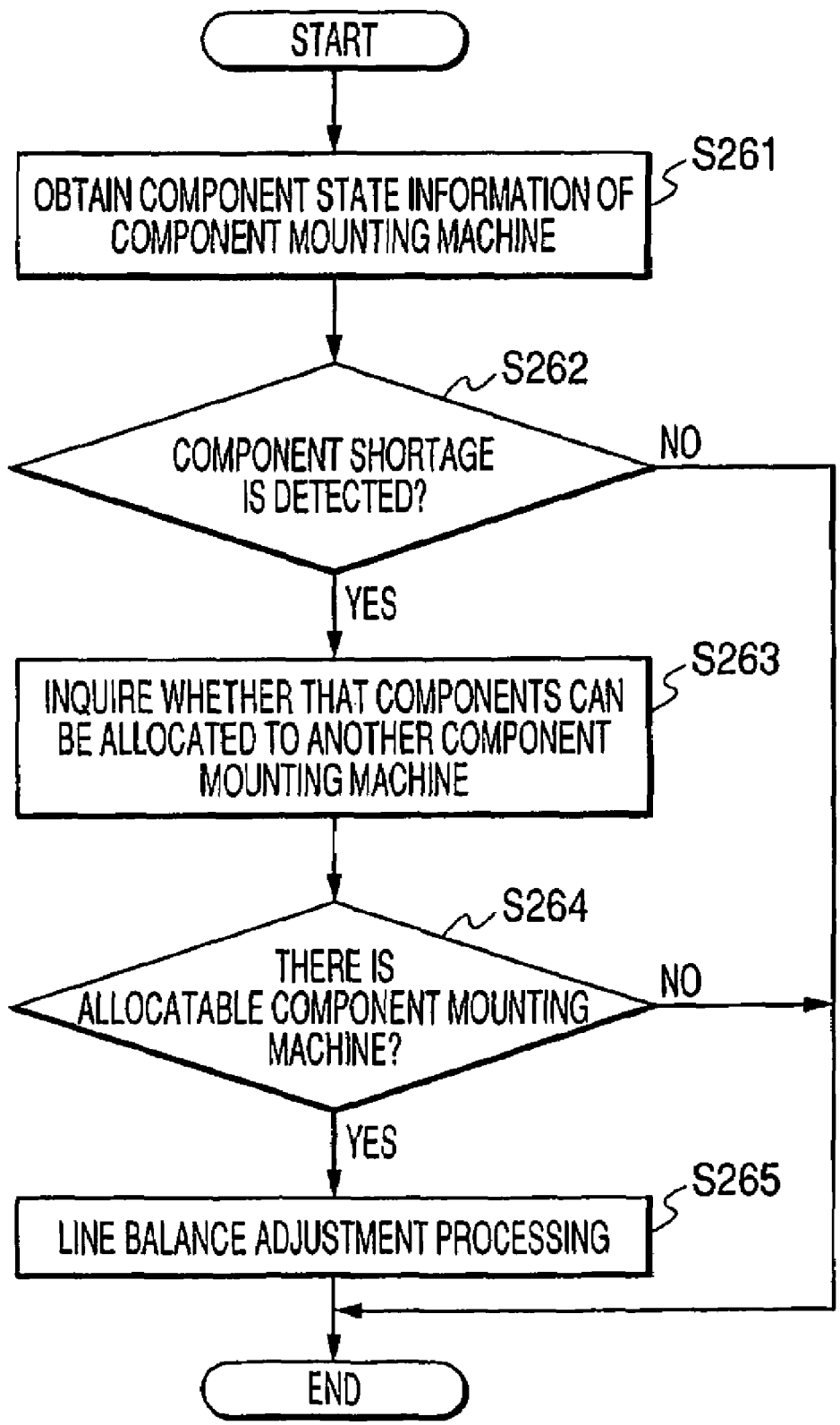
FIG. 26 is a flow chart which shows processing of a line balance control device, by use of a component supply state.

Subsequently, a case of carrying out line balance control by use of a component supply state of a component mounting machine as actual production information will be described. FIG. 26 is a flow chart which shows processing of a line balance control device, by use of a component supply state.

As shown in FIG. 26, firstly, the component supply state information obtaining section 512 obtains component supply state information of a component mounting machine (S261). In case that component shortage was detected (YES of S262), inquired is whether or not that component can be allocated to another component mounting machine (whether or not there is a component mounting machine in which components, which have been run out as component shortage, are loaded) (S263). Then, if there is an allocatable component mounting machine (YES of S264), line balance adjustment processing is carried out (S265).

On one hand, in case that component shortage is not detected (NO of S262), or in case that there is no allocatable component mounting machine (NO of S264), line balance control is not carried out. Meanwhile, in case that there is no allocatable component mounting machine, warning of informing component shortage may be announced from an announcing section (not shown in the figure) according to need.

Figure 27A:
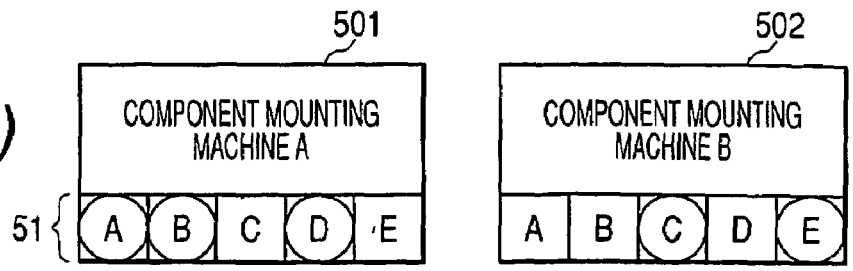
FIG. 27 is an explanatory view which shows one example of line balance adjustment to component shortage.

FIG. 27 is an explanatory view which shows one example of line balance adjustment to component shortage. In FIG. 27(a), components A, B, C, D, E are supplied to component supply sections 51 of the component mounting machines 501, 502, respectively. Then, the component mounting machine A mounts the components A, B, D, and the component mounting machine B mounts the components C, E.

Figure 27B:
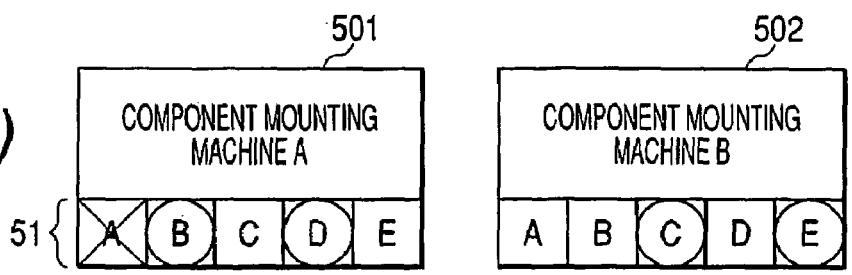

However, as shown in FIG. 27(b), in the component mounting machine 501, in case that the components A fell in component shortage, the component mounting machine 501 notifies to the line balance control device 600 that there occurred component shortage, and the line balance control device 600 moves one in charge of mounting the components A to the component mounting machine 502. In this regard, however, the component mounting machine 501 carries out mounting of the components A, and thereby, production time increases.

Figure 27C:
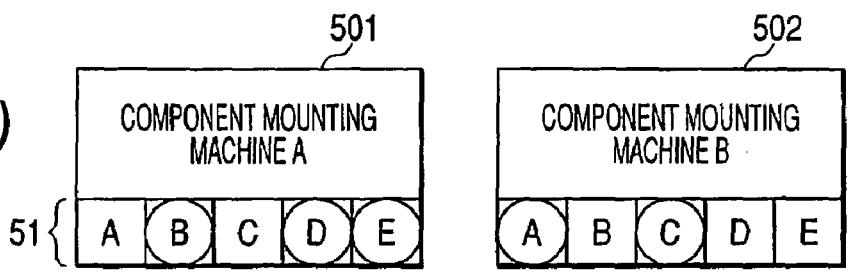

Therefore, as shown in FIG. 27(c), in lieu of allocating the components A to the component mounting machine 502, carried out is such adjustment of line balance that the components E are allocated to the component mounting machine 501. Meanwhile, this adjustment of line balance may be carried out by, for example, a component allocating method as in the first embodiment.

Figure 28A:
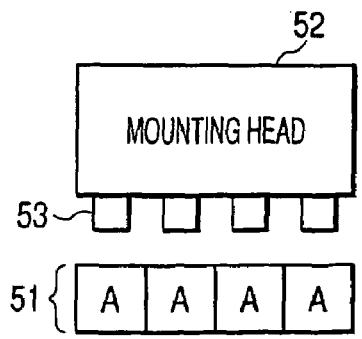
FIG. 28 is an explanatory view which shows another example of line balance adjustment to component shortage.

FIG. 28 is an explanatory view which shows another example of line balance adjustment to component shortage. As shown in FIG. 28(a), in the component supply section 51, the same components "A" are disposed in a plurality of supply sections. In this manner, in case that the same components A are disposed in a plurality of positions, and furthermore, a mounting head 52, which mounts components on a substrate, has a plurality of absorbing nozzles 53, it is possible to carry out absorption of components at the same time, and therefore, it is effective to reduce production time, especially in case that the number of the components A is large.

Figure 28B:
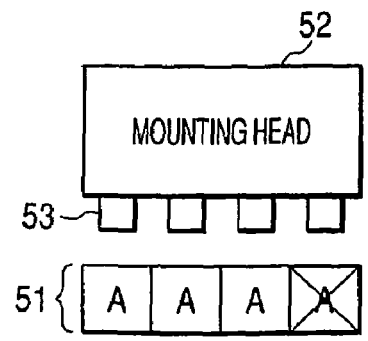

However, as shown in FIG. 28(b), in case that there occurred component shortage even in one place, among a plurality of identical components which have been disposed, time necessary for absorption becomes double. This becomes a cause for increasing production time of a substrate, and there is such a possibility that it leads to deterioration of line balance.

Therefore, in case that there occurred component shortage in a portion of supply sections, among identical components which were disposed in a plurality of supply sections, processing of allocating only components of an amount which corresponds to that portion of supply sections, to another component mounting machine is carried out. That is, identical components are to be mounted by a plurality of component mounting machines.

As above, even in case that component shortage occurred, it is possible to carry out adjustment processing of line balance flexibly.

Figure 29:
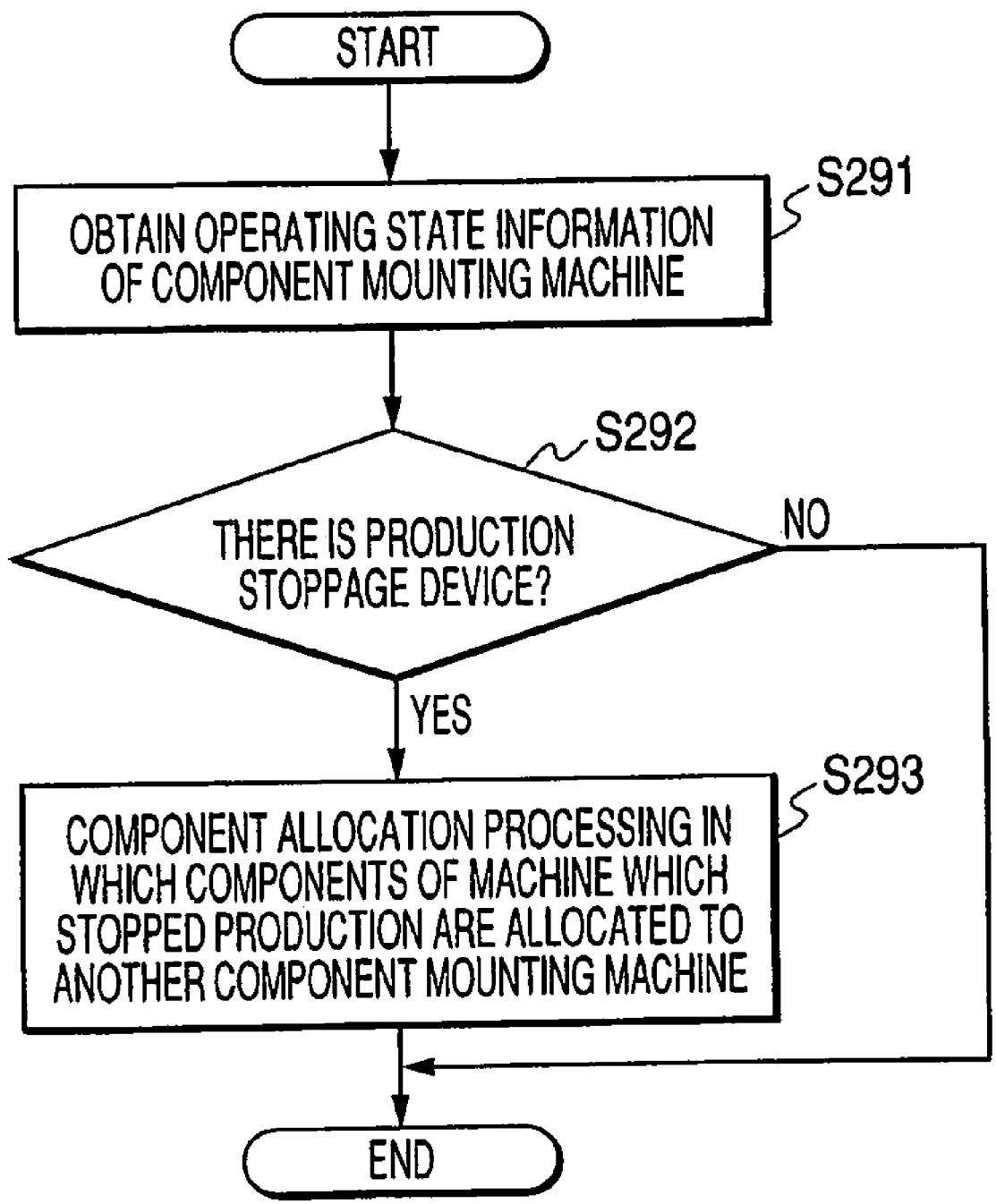
FIG. 29 is a flow chart which shows processing of a line balance control device, by use of component mounting machine operating state information.

FIG. 29 is a flow chart which shows processing of a line balance control device, by use of component mounting machine operating state information. As shown in FIG. 29, in case that operating state information of a component mounting machine is obtained (S291) and a production stoppage device was detected (YES of S292), component allocation processing of allocating components of a machine which stopped production to another component mounting machine (S293).

By this means, it is possible to carry out line balance adjustment processing of detecting production stoppage of a component mounting machine and allocating to another component mounting machine, and thereby, it is possible for a device itself which was connected to a production line to respond promptly, even in such a state that a mounting word of components is not carried out, due to maintenance and malfunction of an apparatus.

Figure 30:
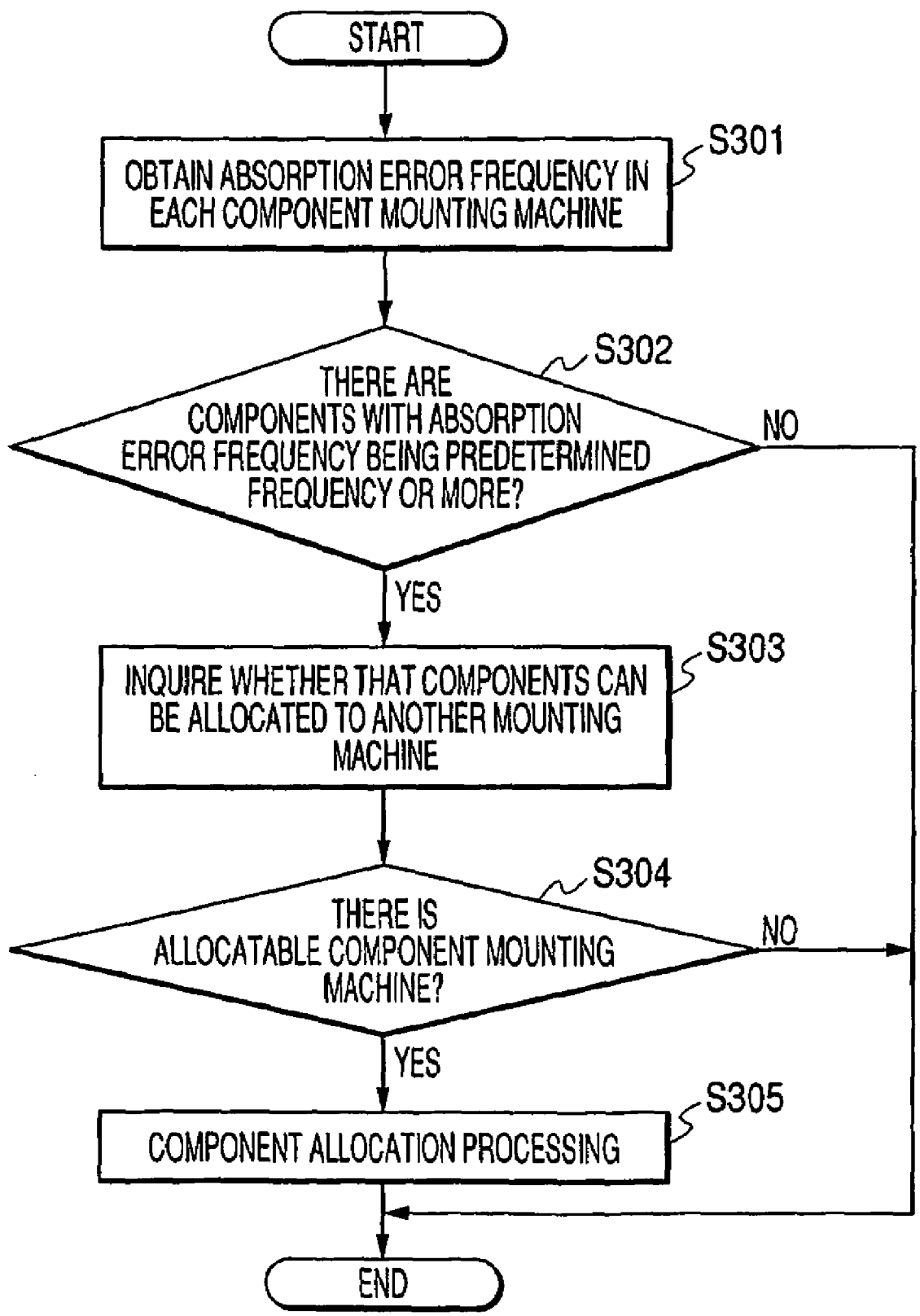
FIG. 30 is a flow chart which shows processing of a line balance control device in case that absorption error information was used as error information.

FIG. 30 is a flow chart which shows processing of a line balance control device in case that absorption error information was used as error information. As shown in FIG. 30, the actual production information obtaining section 620 obtains information which shows absorption error frequency that the absorption error information obtaining section 513 of the component mounting machine 500 obtained (S301).

In case that absorption error frequency, which was obtained by the judging section 630, is predetermined frequency or more (YES of S302), inquired is whether or not that components with high absorption error frequency can be allocated to another component mounting machine (S303). Then, if there is an allocatable component mounting machine (YES of S304), line balance adjustment processing is carried out (S305.) On one hand, in case that absorption error frequency is lower than predetermined frequency (NO of S302), or there is no allocatable component mounting machine (NO of S264), line balance control is not carried out.

As absorption errors are frequent, production time increases, and therefore, there may be such a case that it leads to deterioration of line balance and increase of overall production time. Therefore, by allocating components with high absorption error frequency to another component mounting machine, it is possible to realize improvement of line balance and shortening of production time.

Furthermore, as causes of absorption errors, conceivable are causes such as variation of that components, position control of a mounting head, and an absorbing nozzle. At any rate, in case that absorption errors are frequent, it is also conceivable that there is high possibility that a mounting error etc. to that mounting occurs. Therefore, by allocating components with high absorption error frequency to another component mounting machine, it is possible to realize quality improvement of substrates to be produced.

According to the such like second embodiment, it is possible to carry out line balance control reflecting a state after start of actual production, and therefore, it is possible to improve production efficiency.

Third Embodiment

In the first embodiment, allocation of components is to be carried out by an interactive mode between an apparatus and component mounting machines. Therefore, even in case that a configuration of a production line was changed, it is possible to control line balance flexibly, by holding a talk between component mounting machines again. However, there can be such a case that a component mounting machine, which carries out line balance control, is discarded and removed, along with a change etc. of the production line. In this case, allocation data of which components being allocated to which mounting machine is to disappear, and therefore, it becomes difficult to re-configure a production line including placement of component mounting machines.

On this account, in this embodiment, on the occasion that a component mounting machine, which carries out line balance control, is discarded and removed, another component mounting machine, which carries out next line balance control, is specified, and the specified component mounting machine is to take over the allocation data, The suchlike allocation data is data which associated components on a substrate with a mounting machine of that components. The newly specified component mounting machine carries out line balance control, and therefore, it is possible to start production of substrate immediately, after a new production line was configured.

In addition, even if there is no plan to discard and remove a component mounting machine which carries out line balance control, it may be configured in such a manner that the component mounting machine transmits allocation data to at least one other component mounting machine preliminarily and each component mounting machine holds the allocation data. In the suchlike configuration, any component mounting machine can become a main body of allocation, at any time point.

As above, various embodiments of the invention were described, but the invention is not limited to matters shown in the above-described embodiments, and it is a thing which the invention plans that, on the basis of descriptions of claims and a specification and well-known technologies, a person with ordinary skill in the art carries out modifications and applications thereof, and they are included in a scope for seeking protection.

A line balance control method and a line balance control apparatus of the invention have such an advantage that line balance control without need of a higher-level device is possible, and also has such an advantage that line balance control reflecting an actual production state is possible, and they are useful for a substrate production line etc. including a plurality of component mounting machines.

The invention claimed is:

1. A line balance control method which targets at production line having a plurality of component mounting machines that mount components on a substrate and which controls line balance by allocating components to be mounted, to each component mounting machine, including a possibility inquiring step in which at least one of devices including the component mounting machines that configure the production line makes an inquiry of whether or not it is possible to mount components to be allocated, to component mounting machines which become allocation destinations;

a possibility obtaining step in which the device obtains a response to the inquiry in the possibility inquiring step; and an allocating step in which the device or another device that configures the production line allocates components to be mounted, to each component mounting machine, in such a manner that mounting time at each component mounting machine is equalized, on the basis of the response obtained in the possibility obtaining step.

2. The line balance control method according to claim 1, wherein the possibility inquiring step is carried out by a device which does not require optimization of that device itself, among devices which are included in the production line.

3. The line balance control method according to claim 2, wherein the device, which does not require the simple body optimization, is any one of a printing machine and a reflow machine.

4. The line balance control method according to claim 1, further comprising:

a step of obtaining a load which is loaded to an arithmetic processing section that each device, which is included in the production line, has, through a communication line connected between the devices, wherein the possibility inquiring step is carried out by a device which has the largest room in processing ability of the arithmetic processing section.

5. The line balance control method according to claim 1, further comprising:

a step of obtaining a connecting position in the production line, wherein, in case that mounting of components by use of the plurality of component mounting machines is carried out in the order corresponding to component height, the possibility inquiring step is carried out by a component mounting machine which has been connected to uppermost stream.

6. The line balance control method according to claim 1, further comprising:

a step of obtaining a connecting position in the production line, wherein, in case that mounting of components by use of the plurality of component mounting machines is carried out in the order corresponding to component height, the possibility inquiring step is carried out by a component mounting machine which has been connected to lowermost stream.

7. The line balance control method according to claim 1, further comprising:

a step of obtaining production time of each device which is included in the production line, through a communication line which was connected between the devices, wherein the possibility inquiring step is carried out by a component mounting machine in which the production line is the longest.

8. The line balance control method according to claim 1, further comprising:

a step of obtaining production time of each device which is included in the production line, through a communication line which was connected between the devices, wherein the possibility inquiring step is carried out by a component mounting machine in which the production line is the shortest.

9. An apparatus which carries out control of line balance intended for a production line including a plurality of component mounting machines and configures the production line, comprising:

a possibility inquiring section, which makes an inquiry of whether or not it is possible to mount components to be allocated, among the components to be mounted, to component mounting machines which become allocation destinations;

a possibility obtaining section, which obtains a response to the inquiry in the possibility inquiring section; and an allocating section, which allocates components to be mounted, to each component mounting machine, in such a manner that mounting time at each component mounting machine is equalized, on the basis of the response obtained in the possibility obtaining section.

10. The apparatus according to claim 9, further comprising:

another device information obtaining section, which obtains at least one information of information of a load which is loaded to an arithmetic processing section, connecting position information, production time information, in another device which is included in the production line, through a communication line; and an allocation control section, which decides whether the possibility inquiring section, the possibility obtaining section, and the allocating section are operated or not, on the basis of information of the obtained another device information and corresponding own device information.

11. A computer readable recording medium on which a program is recorded, wherein the program targets at production line having a plurality of component mounting machines that mount components on a substrate, for controlling line balance by allocating components to be mounted, to each component mounting machine, the program having an arithmetic processing section of at least one of devices including the component mounting machines that configure the production line, executed a process of making an inquiry of whether or not it is possible to mount components to be allocated, to component mounting machines which become allocation destinations, and a process of obtaining a response to the inquiring process and, having the device or another device that configures the production line, executed a process of allocating components to be mounted, to each component mounting machine, in such a manner that mounting time at each component mounting machine is equalized, on the basis of the response obtained in the obtaining process.

12. A line balance control method which targets at a production line having a plurality of component mounting machines that mount components on a substrate, having an actual production information obtaining step of obtaining actual production information regarding a state after actual production start from each component mounting machine;

a judging step of judging whether or not control of line balance is necessary or not on the basis of the actual production information of each component mounting machine; and a line balance adjusting step of carrying out at least one processing among component allocation to each component mounting machine and a change of a mounting pattern on a substrate which each component mounting machine is in charge of, in case that it was judged that the control of line balance is necessary.

13. The line balance control method according to claim 12, wherein the actual production information obtaining step includes a step of obtaining actual production time of each component mounting machine, as the actual production information.

14. The line balance control method according to claim 13, wherein the judging step judges that line balance control is necessary in case that there occurred a difference of a predetermined amount or more, between the actual production time and production time which was virtually obtained.

15. The line balance control method according to claim 13, wherein the judging step judges that line balance control is necessary in case that a difference of actual production time between respective component mounting machines is of a predetermined amount or more.

16. The line balance control method according to claim 13, wherein
the line balance adjusting step further has, in case of carrying out component allocation of each component mounting machine;
a possibility inquiring step of making an inquiry of whether or not it is possible to mount components to be allocated;
a possibility obtaining step of obtaining a response to the inquiry in the possibility inquiring step; and
a step of allocating components to be mounted, to each component mounting machine, in such a manner that mounting time at each component mounting machine is equalized, by use of the obtained actual production time, on the basis of the response obtained in the possibility obtaining step.

17. The line balance control method according to claim 13, wherein
the line balance adjusting step carries out allocation of the number of mounting patterns in accordance with a ratio of actual production time between the component mounting machines, in case of changing the mounting pattern which each component mounting machine is in charge of.

18. The line balance control method according to claim 12, wherein
the actual production information obtaining step includes a step of obtaining a component supply state in each component mounting machine, as the actual production information.

19. The line balance control method according to claim 18, wherein the judging step judges that control of line balance is necessary in case that component shortage was detected, as the component supply state.

20. The line balance control method according to claim 19, wherein the line balance adjusting step allocates components of the component shortage, to a component mounting machine which is different from a component mounting machine in which the component shortage is detected.

21. The line balance control method according to claim 12, wherein the actual production information obtaining step includes a step of obtaining production stoppage information in each component mounting machine, as the actual production information, and
the judging step judges that control of line balance is necessary, in case that there exists a component mounting machine which stopped production, and
the line balance adjusting step allocates components which the component mounting machine, which stops production, is mounting, to a component mounting machine other than the component mounting machine which stopped production.

22. The line balance control method according to claim 12, wherein
the actual production information obtaining step includes a step of obtaining information which shows frequency of errors due to at least one of absorption errors and mounting errors of components to be mounted in each component mounting machine, as the actual production information, and
the judging step judges that line balance adjustment is necessary in case that there exist components with the error frequency of a predetermined amount or more, and
the line balance adjusting step includes a step of allocating components with errors of the predetermined frequency or more, to another component mounting machine.

23. The line balance control method according to claim 1, further comprising:
a step in which a device, which allocated components to be mounted to each component mounting machine, specifies another device; and
a step of giving allocation data describing which component mounting machine components to be mounted, which are used in the allocating step, are allocated to, to the specified another device.

24. The line balance control method according to claim 1, further comprising:
a step of giving allocation data describing which component mounting machine components to be mounted, which are used in the allocating step, are allocated to, to at least one another device other than the device which allocated components to be mounted, to each component mounting machine.

25. The line balance control method according to claim 12, wherein the line balance adjusting step is carried out in such a manner that mounting time at each component mounting machine is equalized.

* * * * *

UNITED STATES PATENT AND TRADEMARK OFFICE
CERTIFICATE OF CORRECTION

| | | |
|---|---|---|
| PATENT NO. | : 7,664,554 B2 | Page 1 of 1 |
| APPLICATION NO. | : 10/597285 | |
| DATED | : February 16, 2010 | |
| INVENTOR(S) | : Yasuhiro Maenishi and Ikuo Yoshida | |

It is certified that error appears in the above-identified patent and that said Letters Patent is hereby corrected as shown below:

In Column 1, line 50, please delete the "," after the word by.

In Column 2, line 9, please delete "are flow" and insert --a reflow--.

In Column 4, line 48, please delete "by" and insert --By--.

In Column 9, line 7, please delete "amounting" and insert --a mounting--.

In Column 19, line 24, please delete "amounting" and insert --a mounting--.

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,664,554 B2
APPLICATION NO. : 10/597285
DATED : February 16, 2010
INVENTOR(S) : Maenishi et al.

It is certified that error appears in the above-identified patent and that said Letters Patent is hereby corrected as shown below:

(*) Notice: should read, Subject to any disclaimer, the term of this patent is extended or adjusted under 35 U.S.C. 154 (b) by 543 days.

Signed and Sealed this

Thirty-first Day of August, 2010

David J. Kappos
*Director of the United States Patent and Trademark Office*